United States Patent
Long et al.

(10) Patent No.: US 11,681,428 B2
(45) Date of Patent: Jun. 20, 2023

(54) LOCATION ADJUSTMENT METHOD AND APPARATUS FOR CONTROL IN APPLICATION, DEVICE, AND STORAGE MEDIUM

(71) Applicant: Tencent Technology (Shenzhen) Company Limited, Shenzhen (CN)

(72) Inventors: Yuqi Long, Shenzhen (CN); Shuting Zhang, Shenzhen (CN); Shuai Han, Shenzhen (CN); Meng Qiu, Shenzhen (CN); Jianquan Li, Shenzhen (CN); Qiwen Zheng, Shenzhen (CN); Ruci Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/501,399

(22) Filed: Oct. 14, 2021

(65) Prior Publication Data

US 2022/0083186 A1  Mar. 17, 2022

Related U.S. Application Data

(63) Continuation of application No. PCT/CN2021/115379, filed on Aug. 30, 2021.

(30) Foreign Application Priority Data

Sep. 11, 2020 (CN) .......................... 202010953363.2

(51) Int. Cl.
*G06F 3/0486* (2013.01)
*G06F 3/01* (2006.01)
(Continued)

(52) U.S. Cl.
CPC ........ *G06F 3/0486* (2013.01); *A63F 13/2145* (2014.09); *A63F 13/53* (2014.09);
(Continued)

(58) Field of Classification Search
CPC ...... A63F 13/22; A63F 13/2145; A63F 13/53; G06F 3/0486; G06F 3/016; G06F 3/04817
See application file for complete search history.

(56) References Cited

U.S. PATENT DOCUMENTS 5,669,006 A * 9/1997 Joskowicz .............. G06T 19/20
715/202
10,445,571 B1  10/2019 Gaeta et al.
(Continued)

FOREIGN PATENT DOCUMENTS

CN  105843520 A  8/2016
CN  107918481 A  4/2018
(Continued)

OTHER PUBLICATIONS

International Search Report and Written Opinion received for Application No. PCT/CN2021/115379 dated Nov. 26, 2021 (English and Chinese languages), (11 pages).
(Continued)

*Primary Examiner* — Daniel Samwel
(74) *Attorney, Agent, or Firm* — Crowell & Moring LLP

(57) ABSTRACT

A location adjustment method and apparatus provide for improved control. In a virtual environment picture, a temporary entry control and a function prompt information about location customization are displayed. A location adjustment operation is triggered on the temporary entry control, and a drag operation on the temporary entry control is provided in an editing state, with the temporary entry control dragged from a first location to a second location. The temporary entry control is displayed at the second location. When the temporary entry control is displayed for the first time, a location of the temporary entry control is adjusted by directly dragging the temporary entry control,
(Continued)

which simplifies location adjustment and improves efficiency.

20 Claims, 13 Drawing Sheets

(51) Int. Cl.
*G06F 3/04817* (2022.01)
*A63F 13/2145* (2014.01)
*A63F 13/53* (2014.01)
*A63F 13/22* (2014.01)

(52) U.S. Cl.
CPC .......... *G06F 3/016* (2013.01); *G06F 3/04817* (2013.01); *A63F 13/22* (2014.09)

(56) References Cited

U.S. PATENT DOCUMENTS

| | | | | |
|---|---|---|---|---|
| 10,521,854 | B1* | 12/2019 | Andrizzi | G06Q 30/0631 |
| 2008/0244423 | A1* | 10/2008 | Jensen-Pistorius | G06F 9/451 |
| | | | | 715/763 |
| 2011/0009195 | A1* | 1/2011 | Porwal | A63F 13/533 |
| | | | | 463/37 |
| 2012/0220372 | A1* | 8/2012 | Cheung | G06F 3/04886 |
| | | | | 463/37 |
| 2013/0005469 | A1* | 1/2013 | Selim | A63F 13/2145 |
| | | | | 463/37 |
| 2013/0033436 | A1* | 2/2013 | Brinda | H04M 1/67 |
| | | | | 345/173 |
| 2013/0154978 | A1* | 6/2013 | Kim | G06F 3/0483 |
| | | | | 345/173 |
| 2013/0174069 | A1* | 7/2013 | Lee | G06F 3/0486 |
| | | | | 715/769 |
| 2014/0108936 | A1* | 4/2014 | Khosropour | H04L 41/0803 |
| | | | | 715/735 |
| 2014/0221094 | A1* | 8/2014 | Fujioka | A63F 13/533 |
| | | | | 463/31 |
| 2014/0315636 | A1* | 10/2014 | Zarfati | A63F 13/42 |
| | | | | 463/31 |
| 2015/0182856 | A1* | 7/2015 | Mays, III | G06F 3/0488 |
| | | | | 463/31 |
| 2016/0050522 | A1 | 2/2016 | Miller | |
| 2016/0093143 | A1* | 3/2016 | Lamb | G07F 17/3227 |
| | | | | 463/20 |
| 2017/0028295 | A1 | 2/2017 | Patton et al. | |
| 2018/0321843 | A1* | 11/2018 | Giannotti | G06F 3/04845 |
| 2019/0091574 | A1* | 3/2019 | Wei | A63F 13/5378 |
| 2019/0324610 | A1* | 10/2019 | Green | H04N 21/4415 |
| 2020/0142548 | A1* | 5/2020 | Karunamuni | G06F 3/04883 |
| 2020/0159723 | A1* | 5/2020 | Goyal | G06F 40/35 |
| 2021/0008450 | A1* | 1/2021 | Ge | A63F 13/2145 |
| 2021/0260479 | A1 | 8/2021 | Yang | |

FOREIGN PATENT DOCUMENTS

| | | |
|---|---|---|
| CN | 109002241 A | 12/2018 |
| CN | 112083848 A | 12/2018 |
| CN | 109753327 A | 5/2019 |
| CN | 110456907 A | 11/2019 |
| CN | 111290819 A | 6/2020 |
| CN | 111290819 A | 12/2020 |
| JP | 2019-101653 A | 6/2019 |

OTHER PUBLICATIONS

Office Action for China Patent Application No. 110132531 dated Jul. 27, 2022 (Chinese language only) (11 pages).
Notification for Reasons for Refusal for China Patent Application No. 2021-564352 dated Dec. 12, 2022 (Chinese language only) (4 pages).
Singapore Search Report, dated Mar. 20, 2023, pp. 1-3, issued in Singapore Patent Application No. 11202111501U, Intellectual Property Office of Singapore, Singapore.
Singapore Written Opinion, dated Mar. 23, 2023, pp. 1-8, issued in Singapore Patent Application No. 11202111501U, Intellectual Property Office of Singapore, Singapore.
Singapore Invitation to Respond to Written Opinion, dated Mar. 23, 2023, pp. 1-2, issued in Singapore Patent Application No. 11202111501U, Intellectual Property Office of Singapore, Singapore.

* cited by examiner

LOCATION ADJUSTMENT METHOD AND APPARATUS FOR CONTROL IN APPLICATION, DEVICE, AND STORAGE MEDIUM

RELATED APPLICATION

This application is a continuation of PCT/CN2021/115379, filed on Aug. 30, 2021 and entitled "LOCATION ADJUSTMENT METHOD AND APPARATUS FOR CONTROL IN APPLICATION, DEVICE, AND STORAGE MEDIUM", which claims priority to Chinese Patent Application No. 202010953363.2, entitled "LOCATION ADJUSTMENT METHOD AND APPARATUS FOR CONTROL IN APPLICATION, DEVICE, AND STORAGE MEDIUM" filed on Sep. 11, 2020, each of which are incorporated by reference in their entirety.

FIELD OF THE TECHNOLOGY

This application relates to the field of man-machine interaction, and in particular, to a location adjustment method and apparatus for a control in an application, a device, and a storage medium.

BACKGROUND OF THE DISCLOSURE

In an application based on virtual environment settings, such as a third-person shooting (TPS) game, a user may control a virtual object by using a control or controller. For example, the user may control, based on a trigger operation on the control, the virtual object to perform actions such as firing, running, and jumping.

To adapt to operation habits of different players on a control, the application provides a location customization function for control. For example, a user may enter a setting interface from a main interface, adjust a location of a control in the setting interface, and exit the setting interface and return to the main interface after determining that the adjustment is completed.

SUMMARY

A location adjustment method and apparatus for a control in an application, a device, and a storage medium are provided in embodiments of this application. According to one embodiment, a location adjustment method for a control in an application is provided, applicable to a computer device, the method includes: displaying a virtual environment picture acquired from a virtual environment, a temporary entry control being displayed at a first location on the virtual environment picture; displaying function prompt information on the virtual environment picture when the temporary entry control is displayed for a first time, the function prompt information being configured for prompting that the temporary entry control has a location customization function; receiving a location adjustment operation triggered on the temporary entry control, and displaying the temporary entry control in an editing state; receiving a drag operation on the temporary entry control in the editing state, and dragging the temporary entry control from the first location to a second location; and displaying the temporary entry control at the second location on the virtual environment picture in response to that the drag operation is ended at the second location.

According to another embodiment, a location adjustment apparatus for a control in an application is provided, the apparatus includes: a display module, configured to display a virtual environment picture acquired from a virtual environment, a temporary entry control being displayed at a first location on the virtual environment picture. The display module is configured to display function prompt information on the virtual environment picture when the temporary entry control is displayed for a first time, the function prompt information being configured for prompting that the temporary entry control has a location customization function. The display module is configured to receive a location adjustment operation triggered on the temporary entry control and display the temporary entry control in an editing state. The apparatus includes a drag module configured to receive a drag operation on the temporary entry control in the editing state and drag the temporary entry control from the first location to a second location. The display module is configured to display the temporary entry control at the second location on the virtual environment picture in response to that the drag operation is ended at the second location.

According to another embodiment, a terminal is provided, including a processor and a memory, the memory storing at least one instruction, at least one program, a code set, or an instruction set, the at least one instruction, the at least one program, the code set, or the instruction set being loaded and executed by the processor to implement the location adjustment method for a control in an application described in the foregoing embodiment(s).

According to another embodiment, a computer-readable storage medium is provided, the computer-readable storage medium storing at least one instruction, at least one program, a code set, or an instruction set, the at least one instruction, the at least one program, the code set, or the instruction set being loaded and executed by a processor to implement the location adjustment method for a control in an application described in the foregoing embodiment(s).

According to another embodiment, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the location adjustment method for a control in an application described in the foregoing embodiment(s).

The technical solutions provided in the embodiments of this application produce at least the simplifying of operation steps of the location adjustment for the temporary entry control, and improving the efficiency of man-machine interaction. In the method provided, a location adjustment function is provided for the temporary entry control superimposed and displayed on the virtual environment picture. The location adjustment for the temporary entry control may be directly triggered when the temporary entry control is displayed on the virtual environment picture for the first time. The temporary entry control is dragged from the first location to the second location, so that the location adjustment for the temporary entry control is implemented without entering a setting interface of an application, and the location adjustment for the control may be completed only by using two operations of a trigger operation and a drag operation of the location adjustment. This can greatly simplify operation steps of the location adjustment for the temporary entry control, and improve the efficiency of man-machine interaction.

DESCRIPTION OF EMBODIMENTS

Figure 1:
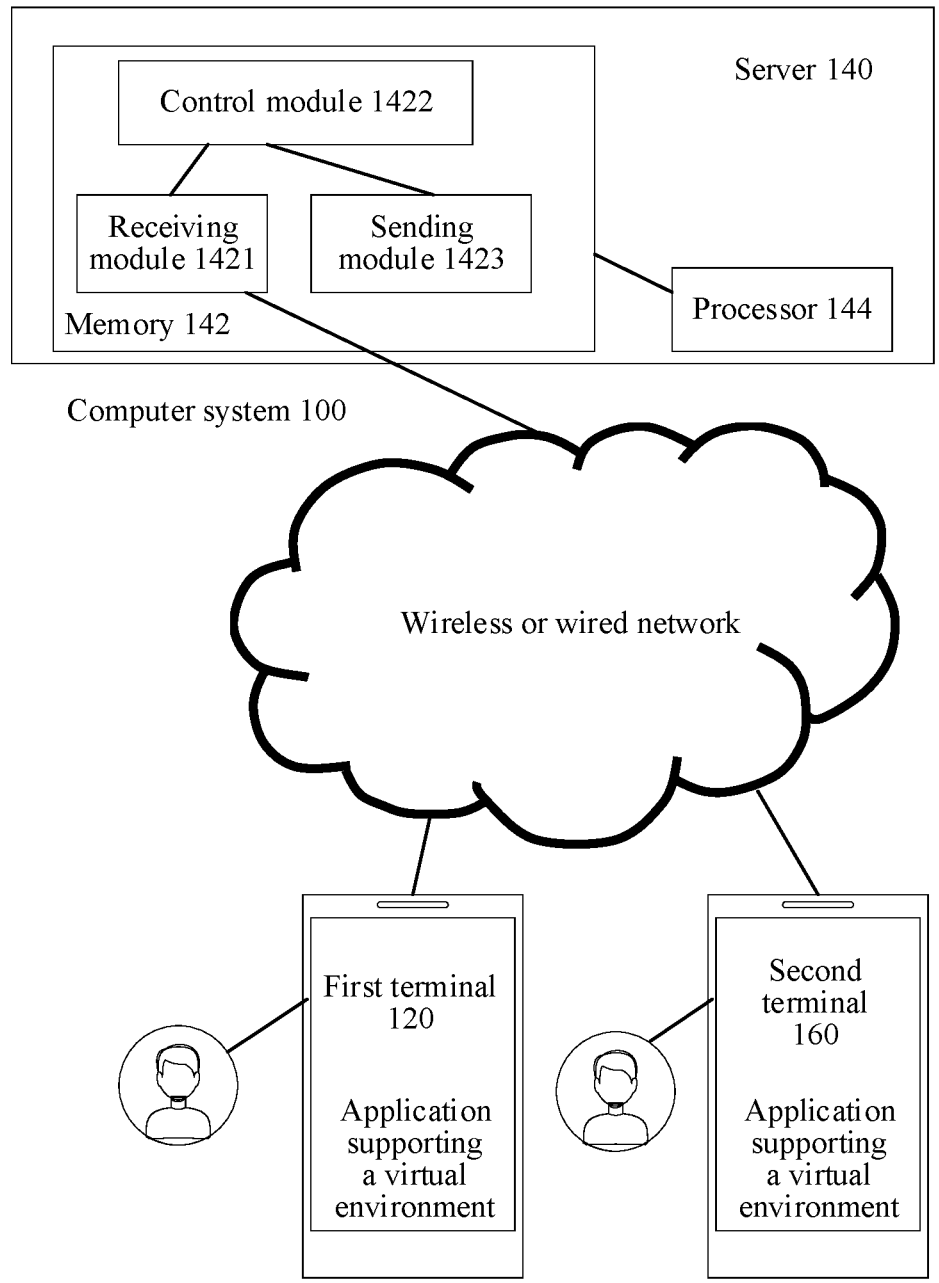
FIG. 1 is a block diagram of a computer system according to one example embodiment.

First, terms involved in the embodiments of this application are introduced:

Virtual environment: It is a virtual environment displayed (or provided) when an application runs on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional (3D) virtual environment. These are merely examples and other examples in additional embodiments are included. A description is made by using an example in which the virtual environment is a 3D virtual environment in the following embodiments.

In some embodiments, the virtual environment may provide a battle environment for at least two virtual objects. For example, in a game, at least two virtual objects play in a single-round battle mode in the virtual environment. The virtual object eludes attacks from other virtual objects and dangers (for example, a poison gas area and a swamp) in the virtual environment to survive in the virtual environment. When a health point of the virtual object in the virtual environment is zero, the life of the virtual object in the virtual environment ends, the final virtual object surviving in the virtual environment is the winner, or the team of the final virtual object surviving in the virtual environment wins. The battle starts with a moment when the first client joins the battle, and ends with a moment when the last client exits the battle. Each client may control one or more virtual objects in the virtual environment. In some embodiments, arena modes of the battle may include a single-player battle mode, a two-player team battle mode, or a multi-player team battle mode. The battle mode is merely one examples and other examples in additional embodiments are included.

For example, the virtual environment may be a picture for observing the virtual environment from a first-person perspective of a virtual object. The picture may also be referred to as a screen or a display screen. For example, a first-person shooting (FPS) game is a shooting game played in the virtual environment from the first-person perspective. The foregoing virtual environment may alternatively be a picture for observing the virtual environment from a third-person perspective of a virtual object. For example, a third-person shooting (TPS) game is a shooting game played in the virtual environment from the third-person perspective.

Virtual object: It is a movable object in a virtual environment. The movable object may be a virtual character, a virtual animal, a cartoon character, or the like, such as a character, an animal, a plant, an oil drum, a wall, a stone, or the like displayed in a 3D virtual environment. In some embodiments, the virtual object is a 3D model created based on a skeletal animation technology. Each virtual object has a shape and size in the 3D virtual environment, and occupies some space in the 3D virtual environment. Virtual objects generally refer to one or more virtual objects in a virtual environment.

A user interface (UI) control refers to any visual control or element that can be seen on a UI of an application, such as a picture, an input box, a text box, a button, or a label. Some of the UI controls respond to user operations. For example, a user may input text in the input box, and interacts with the UI through the foregoing UI controls to switch from one scene to another.

The method provided in this application may be applied to a virtual reality (VR) application, a 3D map program, a military simulation program, an FPS game, a TPS game, a multiplayer online battle arena (MOBA) game, and the like. An application during a game is used as an example for description in the following embodiments.

For example, a game based on a virtual environment is formed by maps of one or more game worlds. The virtual environment in the game simulates scenarios in the real world. A user may control a virtual object in the game through a UI control superimposed and displayed on a virtual environment picture, to perform actions in the virtual environment such as walking, running, jumping, shooting, combating, driving, being attacked by other virtual objects, being injured in the virtual environment, attacking other virtual objects, using disturbing throwing props, and rescuing teammates in the same team, which has high interactivity. In addition, a plurality of users may form a team online to play an arena game.

A type of UI control is further superimposed and displayed on the virtual environment picture in the foregoing game. This type of UI control is used as a temporary entry control, and the temporary entry control refers to an entry control providing a temporary function within a valid time period, that is, a function provided in the temporary entry control can only be used during the valid time period. For example, to celebrate a holiday, a game version is updated to add newly designed holiday activities to a game. In the updated game version, a UI control is newly added on a virtual environment picture, and the newly-added UI control is used as a temporary entry control for activities during the holiday. When receiving a trigger operation on the temporary entry control, a terminal enters the newly-added holiday activities in the game.

For example, the method provided in this application is applied to a computer device, and the computer device includes a terminal. The following embodiment uses the terminal as an example for description. FIG. 1 is a structural block diagram of a computer system according to one example embodiment. The computer system 100 includes a first terminal 120, a server 140, and a second terminal 160.

An application supporting a virtual environment is installed and run on the first terminal 120. The application may be any one of a virtual reality (VR) application, a three dimensional (3D) map program, a military simulation program, an FPS game, a MOBA game, a multiplayer shooting survival game, a battle royale shooting game, and/or an augmented reality (AR) application. The first terminal 120 is a terminal used by a first user, and the first user uses the first terminal 120 to control a first virtual object in the virtual environment to perform a movement. The movement includes, but is not limited to, at least one of body posture adjustment, walking, running, jumping, cycling, aiming, picking-up, using throwing props, and attacking other virtual objects. For example, the first virtual object is a first virtual character, such as a simulated character object or a cartoon character object. For example, the first user controls the first virtual object to perform a movement through a UI control on a virtual environment picture, and a temporary entry control is further included on the virtual environment picture. The first user may further trigger newly-added functions after a version is updated through the temporary entry control, for example, enter an activity interface of newly-added activities through the temporary entry control on the virtual environment picture.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The first terminal 120 is connected to the server 140 by using a wireless network or a wired network. The server 140 includes at least one of one server, a plurality of servers, a cloud computing platform, and a virtualization center. For example, the server 140 includes a processor 144 and a memory 142, and the memory 142 further includes a receiving module 1421, a control module 1422, and a sending module 1423. The receiving module 1421 is configured to receive requests sent by a client, such as a team request; the control module 1422 is configured to control rendering of the virtual environment picture; and the sending module 1423 is configured to send a response to the client, such as sending prompt information that a team is successfully formed to the client. The server 140 is configured to provide a backend service for an application supporting a 3D virtual environment. In some embodiments, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

A synchronization technology may be used in the server 140 to provide consistent pictures between a plurality of clients. For example, the synchronization technology used in the server 140 includes: a state synchronization technology or frame synchronization technology.

An application supporting a virtual environment is installed and run on the second terminal 160. The application may be any one of a VR application, a 3D map program, a military simulation program, an FPS game, a MOBA game, a multiplayer shooting survival game, a battle royale shooting game, a VR application, and an AR application. The second terminal 160 is a terminal used by a second user, and the second user uses the second terminal 160 to control a second virtual object in the virtual environment to perform a movement. The movement includes, but is not limited to, at least one of body posture adjustment, walking, running, cycling, jumping, cycling, aiming, picking-up, using throwing props, and attacking other virtual objects. For example, the second virtual object is a second virtual character, such as a simulated character object or a cartoon character object. For example, when application versions of the second terminal 160 and the first terminal 120 are the same, a temporary entry control is included on a virtual environment picture displayed by the second terminal 160 when a temporary entry control is included on a virtual environment picture displayed by the first terminal 120. The second user may trigger the newly-added functions after the version is updated through the temporary entry control.

In some embodiments, the first virtual object and the second virtual object are located in the same virtual environment. In some embodiments, the first virtual object and the second virtual object may belong to the same team, the same organization, the same camp, have a friend relationship, or have a temporary communication permission. In some embodiments, the first virtual object and the second virtual object may alternatively belong to different camps, different teams, different organizations, or may be enemies of each other.

In some embodiments, the applications installed on the first terminal 120 and the second terminal 160 are the same, or the applications installed on the two terminals are the same type of applications on different operating system platforms (Android or IOS). The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminals are merely examples and other examples in additional embodiments are included.

Figure 2:
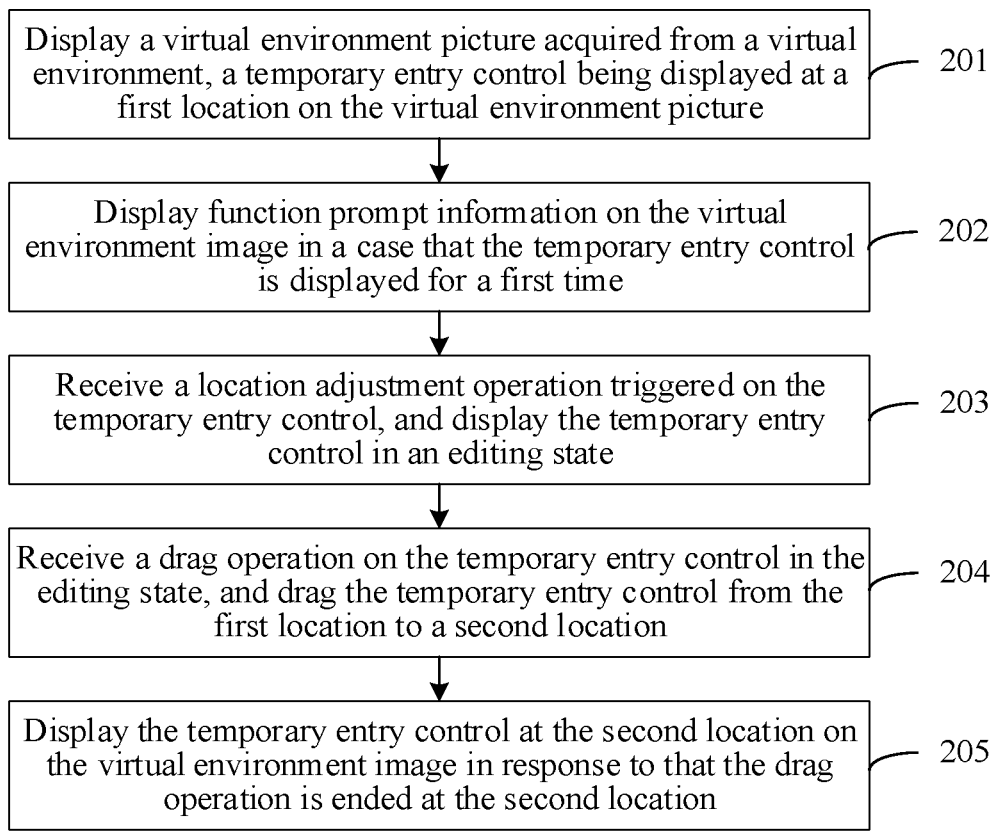
FIG. 2 is a flowchart of a location adjustment method for a control in an application according to one example embodiment.

FIG. 2 is a flowchart of a location adjustment method for a control in an application according to one example embodiment. The method is applicable to the first terminal 120 or the second terminal 160 in the computer system 100 shown in FIG. 1, or another terminal in the computer system. The method includes the following steps:

Step 201. Display a virtual environment picture acquired from a virtual environment, a temporary entry control being displayed at a first location on the virtual environment picture.

The temporary entry control is an entry control that provides a temporary function within a valid time period. In some embodiments, the virtual environment picture is a picture being played. For example, when running an application that supports a virtual environment, a terminal acquires pictures of the virtual environment, and displays a virtual environment picture when a virtual object participates in an activity. The virtual environment picture is a picture being played, in which the virtual object performs an action in an activity. For example, the virtual environment picture is a picture of a virtual object battle being played when the activity is a battle. For example, the virtual environment displayed on the virtual environment picture includes at least one of the following elements: a mountain, a plain, a river, a lake, a sea, a desert, sky, a plant, a building, and a vehicle.

UI controls are superimposed and displayed on the virtual environment picture. The UI controls include controls for implementing a function of controlling a virtual object to perform actions. For example, the UI controls include at least one of an auxiliary UI control, a mobile UI control, an aiming UI control, and a state-switching UI control. The auxiliary UI control is configured to assist a virtual object in activities, such as a scope-open control configured to assist a virtual object in aiming at a target during shooting activities. The mobile UI control is configured to control movement of a virtual object, such as a direction movement control, where a virtual object moves forward, backward, left, and right in the virtual environment when the direction movement control is triggered. The aiming UI control is a corresponding UI control when a virtual object uses a virtual prop, such as a shooting control, where the virtual object shoots at a target when the shooting control is triggered. The state-switching UI control is configured to switch a posture of a virtual object in the virtual environment, such as a squat control. The virtual object switches from a standing state to a squatting state, or from other postures to the squatting state when the squat control is triggered.

In some embodiments, the UI control includes a temporary entry control, and the temporary entry control is configured to trigger a temporary function within a valid time period. For example, when coordination and stability of a newly-added function in a game application are tested, a temporary entry control is added to the game application, and the temporary entry control is used as a trigger control for the newly-added function within a test time period.

In some embodiments, the temporary entry control is an entry control for temporary operational activities, the temporary operational activities being operational activities organized for virtual objects in the virtual environment. For example, during the June 1st activities, a new shooting mode of "hundred shots and hundred hits" is added to the game application, and a temporary entry control for the shooting mode of "hundred shots and hundred hits" is set in a battle scene of a virtual object. A user may enter the shooting mode of "hundred shots and hundred hits" by triggering the temporary entry control. After the virtual object enters the shooting mode of "hundred shots and hundred hits" and uses a virtual weapon to shoot a target object, the target object may be hit within a range of one centimeter from a cross-center location of the virtual weapon.

For example, the temporary entry control displayed on the virtual environment picture is in a non-editing state, and the temporary entry control in the non-editing state cannot be moved on the virtual environment picture.

Step 202. Display function prompt information on the virtual environment picture when the temporary entry control is displayed for the first time.

The function prompt information is used for prompting that the temporary entry control has a location customization function. The terminal acquires historical running information of an application when displaying the virtual environment picture, determines, based on the historical running information, whether the temporary entry control is displayed for the first time, and displays the function prompt information on the virtual environment picture in response to that the historical running information indicates that the temporary entry control is displayed for the first time.

Figure 3:
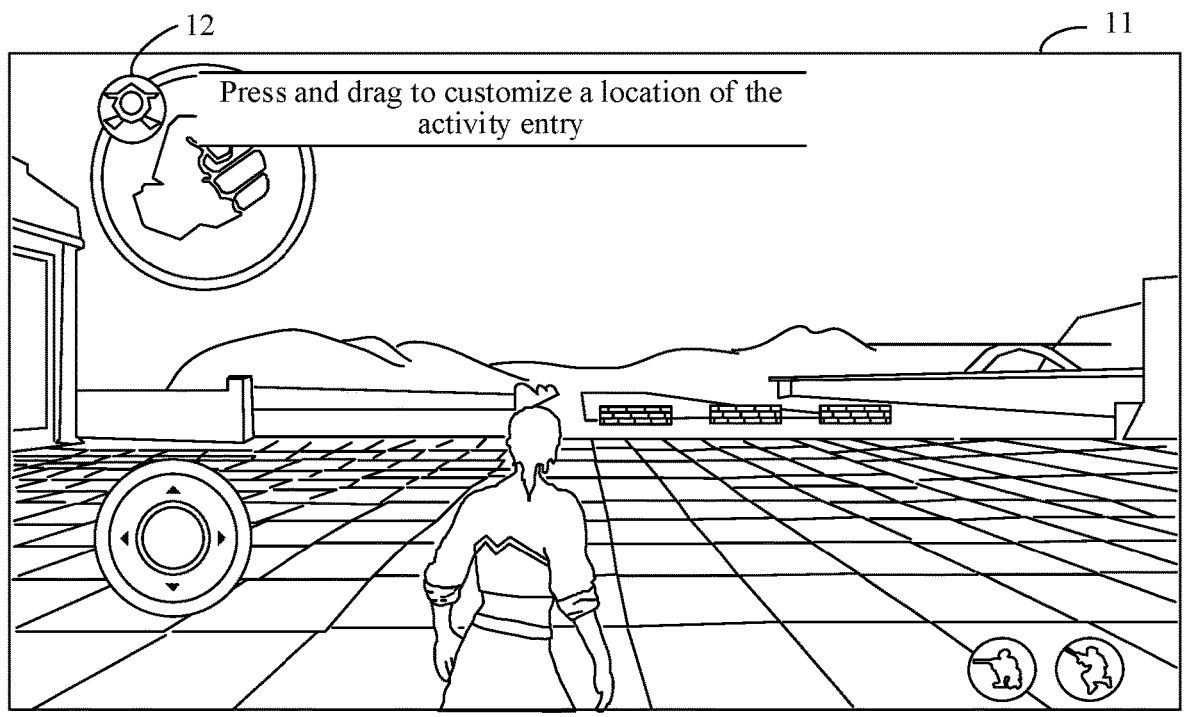
FIG. 3 is a schematic diagram of an interface of location adjustment for a control according to one example embodiment.

For example, a user account is logged in the application, and the historical running information of the application includes: historical display information of each control on the virtual environment picture when the application is running. When the virtual environment picture is displayed, the terminal pulls historical running information corresponding to the user account from the background, and determines, according to the historical running information, whether the temporary entry control is displayed for the first time under the user account. When the temporary entry control is displayed for the first time under the user account, the terminal determines an adjacent location of the first location on the virtual environment picture, and superimposes and displays the function prompt information at the adjacent location. For example, as shown in FIG. 3, a newly-added temporary entry control 12 is displayed on a virtual environment picture 11, and function prompt information "Press and drag to customize a location of the activity entry" is displayed on the right side of the newly-added temporary entry control.

For example, the function prompt information is displayed on the virtual environment picture when the terminal determines that the temporary entry control is displayed for the first time in the application. Alternatively, the function prompt information is displayed on the virtual environment picture when the terminal determines that the temporary entry control is displayed for the first time on the virtual environment picture of the application.

For example, the terminal further determines a display duration of the function prompt information, and cancels the display of the function prompt information when the display duration of the function prompt information is greater than or equal to a display duration threshold, where the display duration threshold is preset in the application; or, the terminal cancels the display of the function prompt information when receiving a click operation at a blank location, where the blank location is a location at which there are no controls on the virtual environment picture.

Step 203. Receive a location adjustment operation triggered on the temporary entry control, and display the temporary entry control in an editing state.

The terminal sets a state of the temporary entry control to the editing state in case that the terminal receives the location adjustment operation triggered on the temporary entry control, and displays the temporary entry control in the editing state on the virtual environment picture. In some embodiments, the location adjustment operation triggered on the temporary entry control includes at least one of a long-press operation, a single-finger double-tap operation, a two-finger double-tap operation, and a hovering operation. For example, the terminal receives, on the temporary entry control, a long-press operation of a first specified duration, or receives a single-finger double-tap operation, or receives a two-finger double-tap operation, or receives a hovering operation of a second specified duration; triggers the temporary location adjustment function of the temporary entry control; sets the state of the temporary entry control to the editing state; and displays the temporary entry control in the editing state on the virtual environment picture.

For example, the location adjustment operation may be a customization operation, that is, a user-defined location adjustment operation. For example, the user may set the location adjustment operation to a long-press operation, a single-finger double-tap operation, a two-finger double-tap operation, or a hovering operation through a setting interface of an application supporting the virtual environment. For example, the specified duration (including at least one of the first specified duration and the second specified duration) may also be a customization duration. For example, the user may set the specified duration on the setting interface. For example, the user may set a first specified duration to four seconds when a trigger operation of a function of the temporary entry control is a long-press operation of two seconds and the user is accustomed to using the long-press operation, the first specified duration being a duration threshold corresponding to the long-press operation when the location adjustment is triggered on the temporary entry control.

Not all temporary entry controls on the virtual environment picture have a movable function. Therefore, after receiving the location adjustment operation triggered on the temporary entry control, the terminal first acquires configuration information of the temporary entry control; and displays the temporary entry control in the editing state when the configuration information indicates that the temporary entry control is a specified type of control. For example, the configuration information includes a control identifier. The terminal searches for the control identifier from the configuration information of the temporary entry control when receiving the location adjustment operation triggered on the temporary entry control; and displays the temporary entry control in the editing state when the control identifier indicates that the temporary entry control is the specified type of control.

In some embodiments, the specified type of control is the entry control for temporary operational activities. In this case, after acquiring the configuration information of the temporary entry control, the terminal displays the temporary entry control in the editing state when the configuration information indicates that the temporary entry control is the entry control for the temporary operational activities. For example, when determining that the temporary entry control is the entry control of the temporary operational activities through the control identifier, the terminal displays the temporary entry control in the editing state; and when determining that the temporary entry control is a display entry control of temporary prompt information through the control identifier, the terminal does not display the temporary entry control in the editing state, that is, a location movement function for the temporary entry control is not triggered when the temporary entry control is not the entry control for the temporary operational activities.

Step 204. Receive a drag operation on the temporary entry control in the editing state, and drag the temporary entry control from the first location to a second location.

When the temporary entry control is in the editing state, the terminal may perform the drag operation on the temporary entry control to drag the temporary entry control from the first location to the second location. In some embodiments, the second location may be any location on the foregoing virtual environment picture. For example, the temporary entry control may be dragged from the first location to the second location on any curved track on the terminal.

For example, when the location adjustment operation is the long-press operation, after the long-press operation, a finger directly drags the temporary entry control without leaving a screen, to drag the temporary entry control from the first location to the second location. When the location adjustment operation is the single-finger double-tap operation, after the second tap operation of the single-finger double-tap operation, the finger directly drags the temporary entry control without leaving the screen. When the location adjustment operation is the two-finger double-tap operation, after the second tap operation of the two-finger double-tap operation, the finger directly drags the temporary entry control without leaving the screen. When the location adjustment operation is the hovering operation, the location adjustment function is triggered after the finger hovers over the temporary entry control for a third specified duration (that is, the temporary entry control is in the editing state), and then the finger is placed on a screen location of the temporary entry control, to drag the temporary entry control; or, the location adjustment function is triggered after the finger hovers over the temporary entry control for the third specified duration, and the finger still hovers over the screen, and moves parallel to the screen within a preset distance above the screen to drag the temporary entry control.

Step 205. Display the temporary entry control at the second location on the virtual environment picture in response to that the drag operation is ended at the second location.

The second location is a placement location of the temporary entry control selected by the user. The user ends the drag operation on the temporary entry control when the temporary entry control is dragged from the first location to the second location. The terminal displays the temporary entry control at the second location on the virtual environment picture in response to that the drag operation is ended at the second location, and sets the temporary entry control to be in the non-editing state.

For example, the terminal receives an end event of the drag operation triggered on the temporary entry control, and displays the temporary entry control in the non-editing state at the second location. For example, the temporary entry control in the non-editing state is displayed at the second location when the finger drags the temporary entry control on the screen, and leaves the screen when the temporary entry control is dragged to the second location. In another example, the temporary entry control in the non-editing state is displayed at the second location when the finger hovers over the screen, and a hovering distance of the finger exceeds a preset distance range when the temporary entry control is dragged to the second location. Alternatively, the drag operation is ended when the finger taps the second location on the screen, and the temporary entry control in the non-editing state is displayed at the second location.

In summary, according to the location adjustment method for a control in an application provided in this embodiment, a location adjustment function is provided for the temporary entry control superimposed and displayed on the virtual environment picture. The location adjustment for the temporary entry control may be directly triggered when the temporary entry control is displayed on the virtual environment picture for the first time. The temporary entry control is dragged from the first location to the second location, so that the location adjustment for the temporary entry control is implemented without entering the setting interface of the application, and the location adjustment for the control may be completed only by using two operations of a trigger operation and a drag operation of the location adjustment, which greatly simplifies operation steps of the location adjustment for the temporary entry control, and improves the efficiency of man-machine interaction.

When the non-editing state of the temporary entry control is switched to the editing state, at least one of the following methods may be used to distinguish the two states:

1. Change a filling element of an icon of the temporary entry control displayed on the virtual environment picture;

The terminal switches a first filling element of the temporary entry control to a second filling element while switching the non-editing state of the temporary entry control to the editing state, where the first filling element is used for indicating that the temporary entry control is in the non-editing state, and the second filling element is used for indicating that the temporary entry control is in the editing state. The temporary entry control in the non-editing state cannot be dragged, and the temporary entry control in the editing state can be dragged to implement the location adjustment for the control.

For example, the filling elements may include at least one of a filling pattern and a filling color. For example, a background color of the icon is transparent and a graphic color of the icon is light blue when the temporary entry control is in the non-editing state. The terminal switches the background color of the icon to bright yellow and the graphic color of the icon to sky blue while switching the temporary entry control from the non-editing state to the editing state. In another example, a pattern in the icon is a shield when the temporary entry control is in the non-editing state. The terminal switches the pattern in the icon to a walking human-shaped shield while switching the temporary entry control from the non-editing state to the editing state.

2. Superimpose and display prompt information on the virtual environment picture;

The terminal determines, in response to the location adjustment operation on the temporary entry control, that the temporary entry control is displayed for the first time, and displays state prompt information. The state prompt information is used for prompting that the temporary entry control is in the editing state where a location thereof may be changed by dragging. For example, the terminal displays prompt information "the location of the icon may be changed by dragging" on one side of the icon corresponding to the temporary entry control while the temporary entry control is switched from the non-editing state to the editing state. For example, the premise of superimposing and displaying the prompt information on the virtual environment picture is that a prompt function for the control location adjustment is turned on. When the prompt function is turned off, the state prompt information is not displayed when the temporary entry control is switched from the non-editing state to the editing state. For example, the state prompt information is displayed when the terminal determines that the temporary entry control is displayed for the first time and the prompt function is turned on; otherwise, the state prompt information is not displayed.

3. Terminal vibration reminder.

The terminal is provided with a vibrator, and the terminal determines that the temporary entry control is displayed for the first time in response to the location adjustment operation on the temporary entry control. The vibrator is controlled to perform a vibration action, and the vibration action is used for prompting that the temporary entry control is in the editing state where a location thereof may be changed by dragging. For example, the vibrator in the terminal vibrates while the temporary entry control is switched from the non-editing state to the editing state, and the user may feel a vibration or even hear a sound of the vibration. For example, the premise for the terminal to initiate the vibration reminder is that a vibration reminder function for the control location adjustment is turned on. When the vibration reminder function is turned off, the vibration reminder is not triggered while the temporary entry control is switched from the non-editing state to the editing state. For example, the vibration reminder is triggered when the terminal determines that the temporary entry control is displayed for the first time and the vibration reminder function is turned on.

Figure 4:
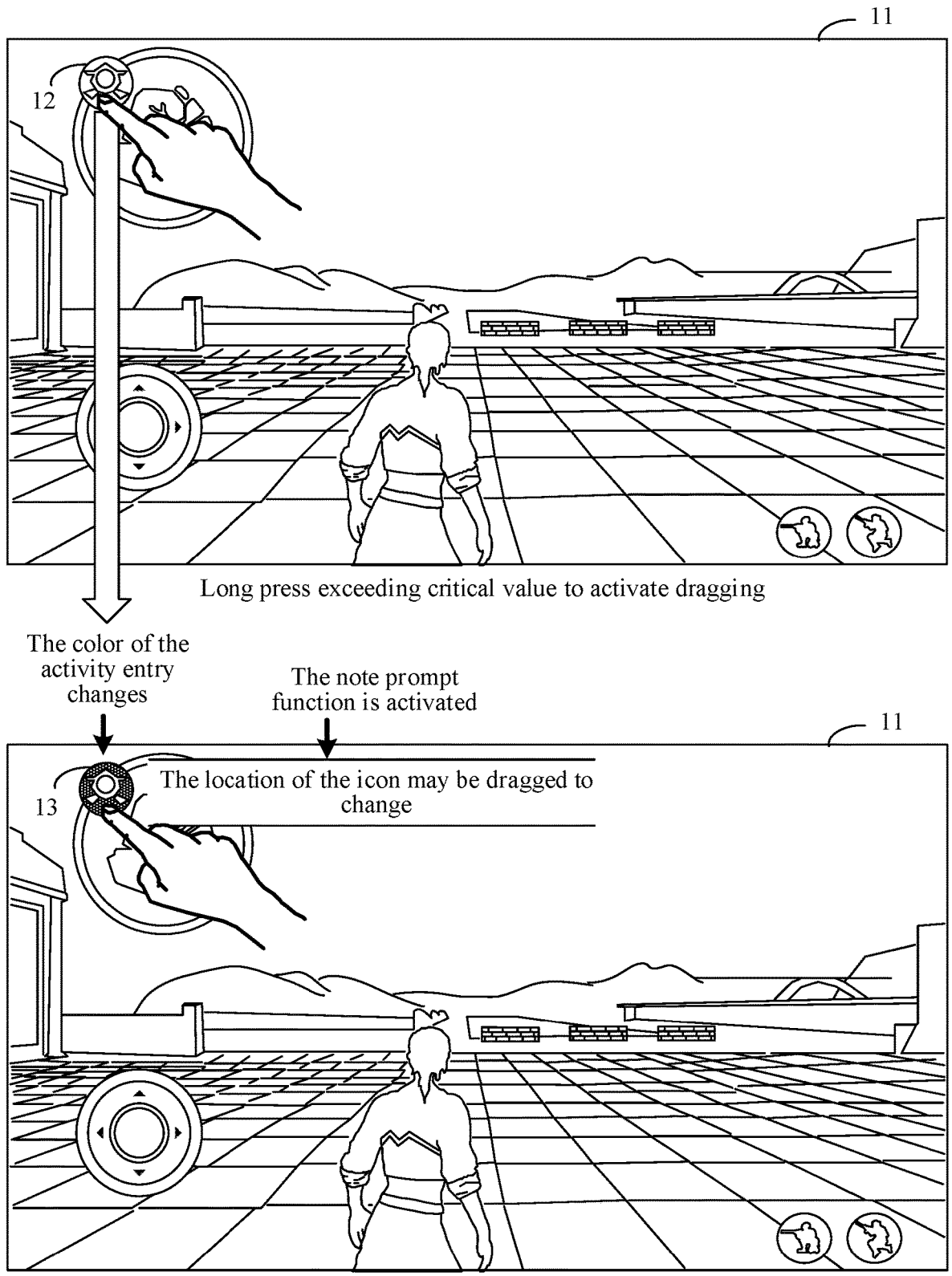
FIG. 4 is a schematic diagram of an interface of location adjustment for a control according to another example embodiment.
Figure 5:
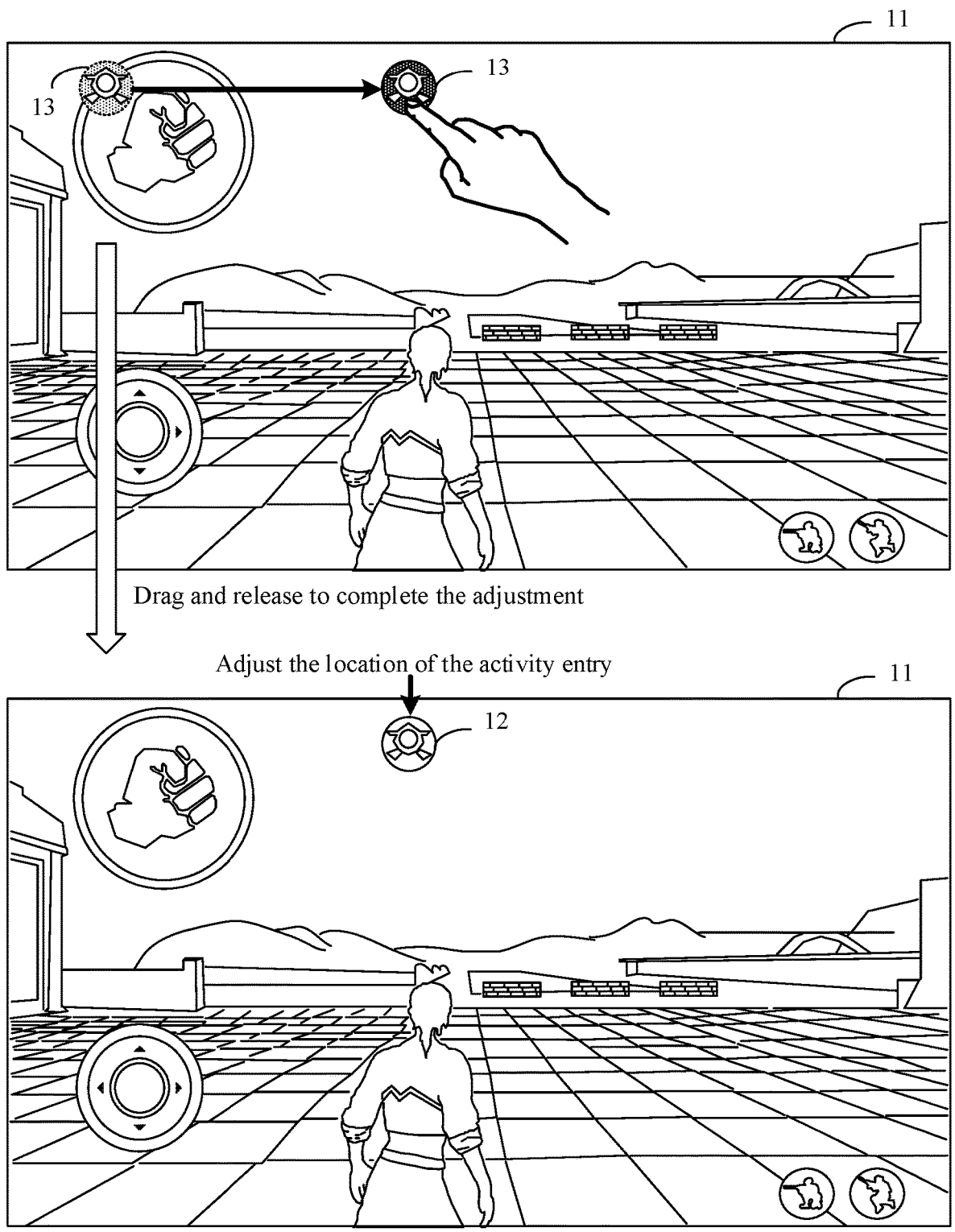
FIG. 5 is a schematic diagram of an interface of location adjustment for a control according to another example embodiment.

For example, as shown in FIG. 4, a temporary entry control 12 in the non-editing state is displayed on the virtual environment picture 11. The terminal receives the long-press operation on the temporary entry control 12, to trigger the location adjustment for the temporary entry control 12. The background color of the icon of the temporary entry control 12 is changed. The temporary entry control 12 in the non-editing state is changed to a temporary entry control 13 in the editing state, and state prompt information "the location of the icon may be dragged to change" is displayed on the right side of the temporary entry control 13 in the editing state. As shown in FIG. 5, after triggering the location adjustment function of the temporary entry control 13, the finger does not leave the screen, and drags the temporary entry control 13 from the first location to the right, until the temporary entry control 13 is dragged to the second location. Then the finger leaves the screen and the drag operation is ended. The temporary entry control 12 in the state is displayed at the second location. As shown in FIG. 2 and FIG. 3, "Activity Entry" is the temporary entry control, the "Note prompt function" is the prompt function, "Long press exceeding critical value" is the "long-press operation", and "Critical value" is the "first specified duration".

The state switching method of the temporary entry control can clearly and promptly prompt the user that the location adjustment function of the temporary entry control is triggered when the location adjustment method for a control in an application is performed, and the drag operation for the temporary entry control may be performed to prevent the user from being unable to grasp the state switching of the temporary entry control.

Figure 6:
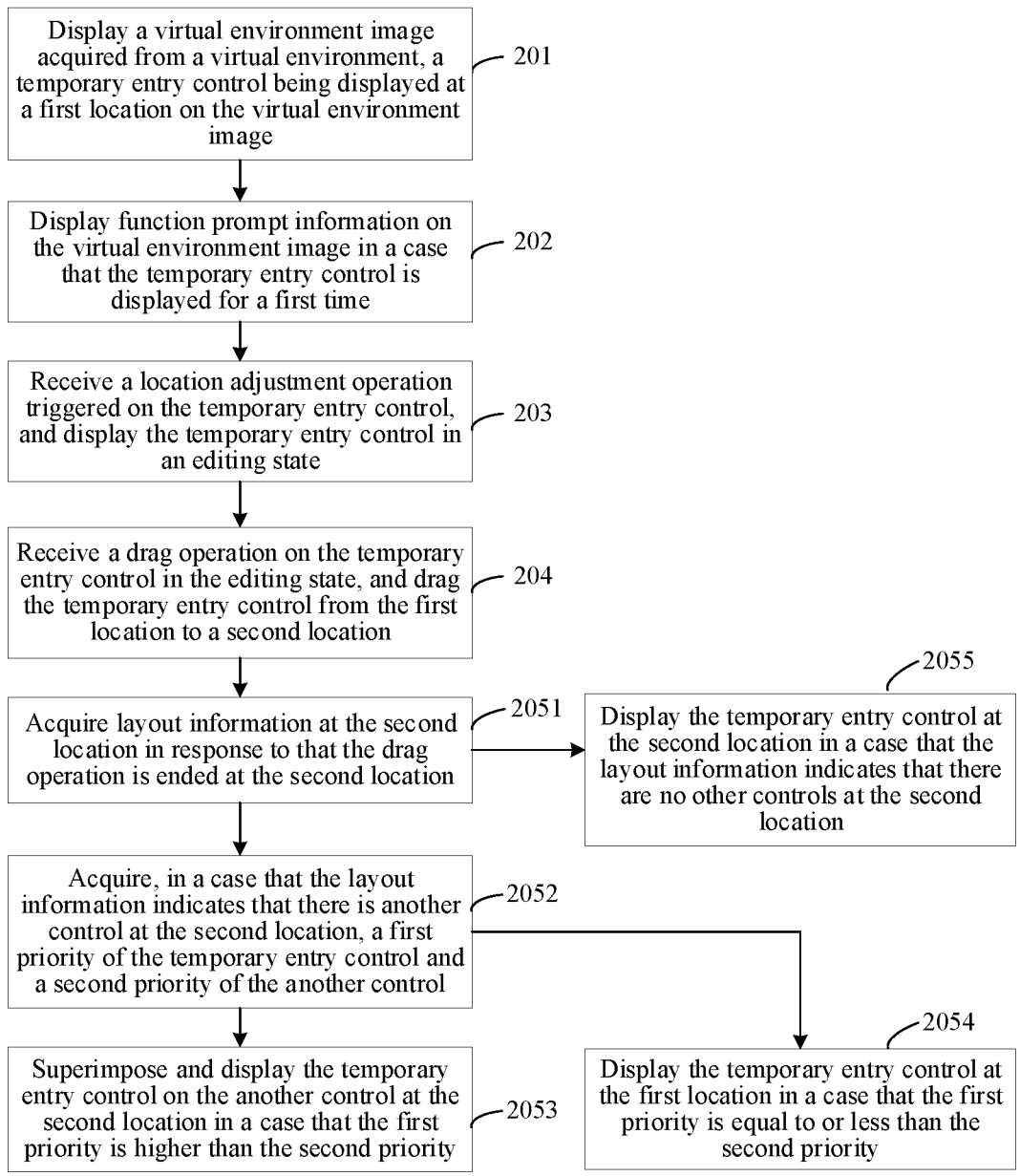
FIG. 6 is a flowchart of a location adjustment method for a control in an application according to another example embodiment.

The temporary entry control may further be placed on another control, that is, the second location may be selected at a location of the another control. For example, as shown in FIG. 6, step 205 may include step 2051 to step 2053, as shown below:

Step 2051. Acquire layout information at the second location in response to that the drag operation is ended at the second location.

In response to that the drag operation on the temporary entry control is ended at the second position, the terminal detects whether there is another control laid out at the second location, performs step 2052 to step 2054 when there is another control laid out at the second location, and performs step 2055 when there are no other controls laid out at the second location.

Step 2052. Acquire, when the layout information indicates that there is another control at the second location, a first priority of the temporary entry control and a second priority of the another control.

The terminal acquires the first priority of the temporary entry control and the second priority of the another control when determining, based on the layout information, that there is another control at the second location, and performs step 2053 to step 2054. In this embodiment, an order of acquiring the first priority and the second priority can be modified in different embodiments.

For example, the configuration information of the temporary entry control includes the priority of the temporary entry control, and the terminal searches for the first priority of the temporary entry control from the configuration information of the temporary entry control; and configuration information of the another control includes the priority of the another control, and the terminal searches for the second priority of the another control from the configuration information of the another control. The priority is used for indicating a display priority of a control.

In some embodiments, the another control may be another temporary entry control. In some embodiments, the another temporary entry control may further be the entry control for the temporary operational activities.

Step 2053. Superimpose and display the temporary entry control on the another control at the second location when the first priority is higher than the second priority.

The display of the temporary entry control takes precedence over the display of the another control when the terminal determines that the first priority is higher than the second priority. The terminal superimposes and displays the temporary entry control on the another control at the second location.

The first priority may alternatively be equal to or less than the second priority. In this case, step 2054 in FIG. 6 is performed, as shown below:

Step 2054. Display the temporary entry control at the first location when the first priority is equal to or less than the second priority.

The display of the another control takes precedence over the display of the temporary entry control when the terminal determines that the first priority is lower than the second priority. Alternatively, the display priorities of the temporary entry control and the another control are in no particular order when the terminal determines that the first priority is equal to the second priority. In this case, the temporary entry control cannot be superimposed on the another control, and the terminal redisplays the temporary entry control at the first location.

There is another case that there are no other controls at the second location. In this case, step 2055 in FIG. 6 is performed, as shown below:

Step 2055. Display the temporary entry control at the second location when the layout information indicates that there are no other controls at the second location.

The terminal directly displays the temporary entry control at the second location when there are no other controls laid out at the second location.

Figure 7:
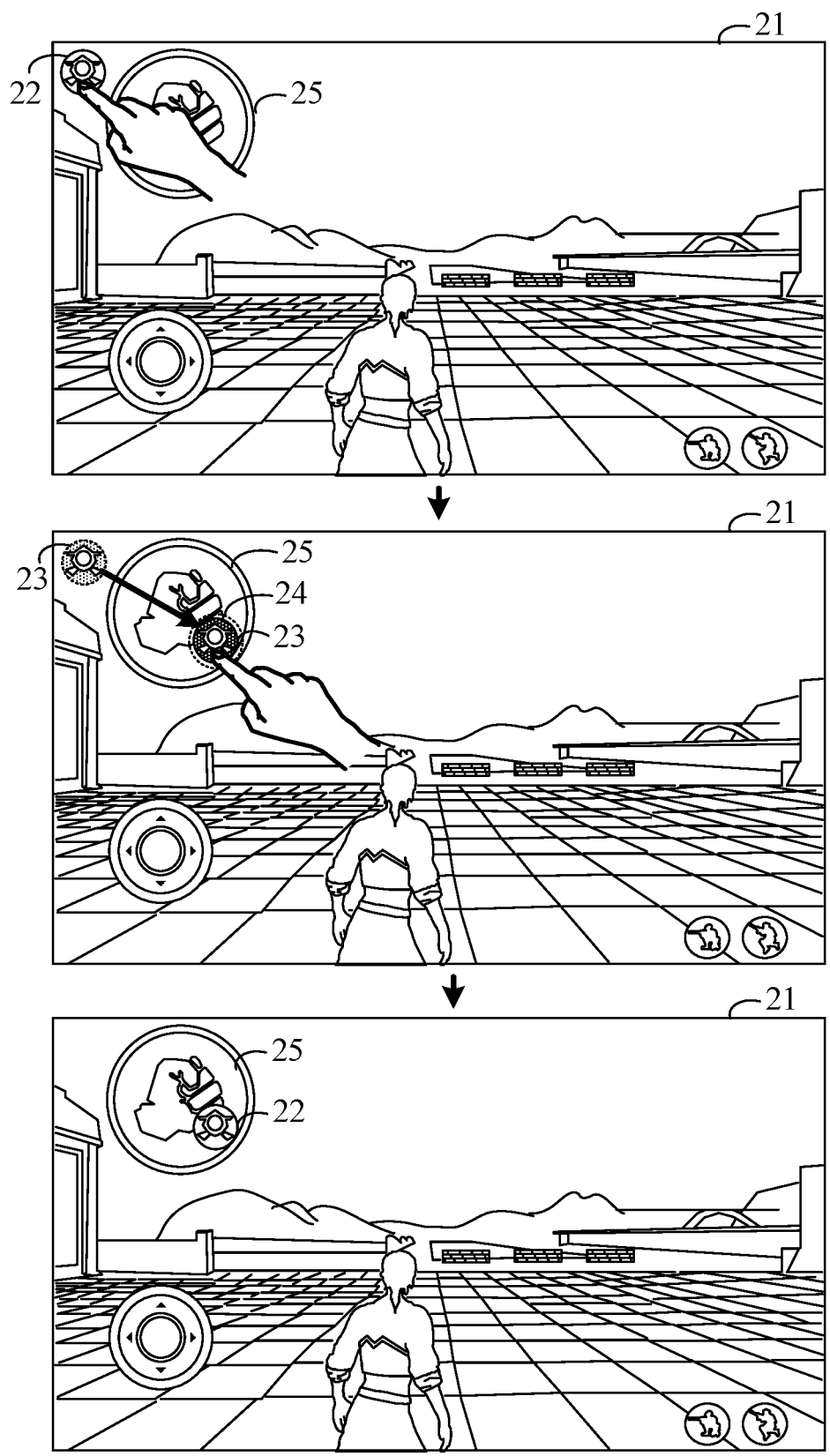
FIG. 7 is a schematic diagram of an interface of location adjustment for a control according to another example embodiment.

For example, as shown in FIG. 7, a temporary entry control 22 in the non-editing state is displayed on a virtual environment picture 21. The terminal receives the long-press operation on the temporary entry control 22, to trigger the location adjustment for the temporary entry control 22. The temporary entry control 22 is changed to a temporary entry control 23 in the editing state. After the location adjustment function of the temporary entry control 23 is triggered, the finger does not leave the screen, and drags the temporary entry control 23 from the first location to the lower right. The temporary entry control 23 is dragged to a second location 24, until the second location 24 is above another control 25. A priority of the another control 25 is lower than a priority of the temporary entry control 22, so that after the finger leaves the screen and completes a placement operation, the temporary entry control 22 is displayed at the second location 24.

In summary, the location adjustment method for a control in an application provided in this embodiment can meet the requirement of the user to superimpose and display one temporary entry control on another temporary entry control, and display a more important temporary entry control on the top. For example, the user may superimpose temporary entry controls that are not commonly used or even not used for display, which can reduce an occupied area on the virtual environment picture, avoid obstructing a line of sight, and also avoid erroneous touch caused by excessive controls on the virtual environment picture. In addition, the temporary entry control is laid out based on the display priority. The temporary entry control cannot be superimposed and displayed on the another control when the priority of the temporary entry control is less than the priority of the another control, which can avoid that the display of the another control completely covers the display of the temporary entry control because a coverage area of the another control is larger than that of the temporary entry control when the temporary entry control is mistakenly placed to a location of the another control with a higher display priority. Once location adjustment needs to be further performed on the temporary entry control or the temporary entry control needs to be used, the user further needs to first adjust the location of the another control, so that the temporary entry control can be adjusted, which further avoids reducing the efficiency of man-machine interaction.

Figure 8:
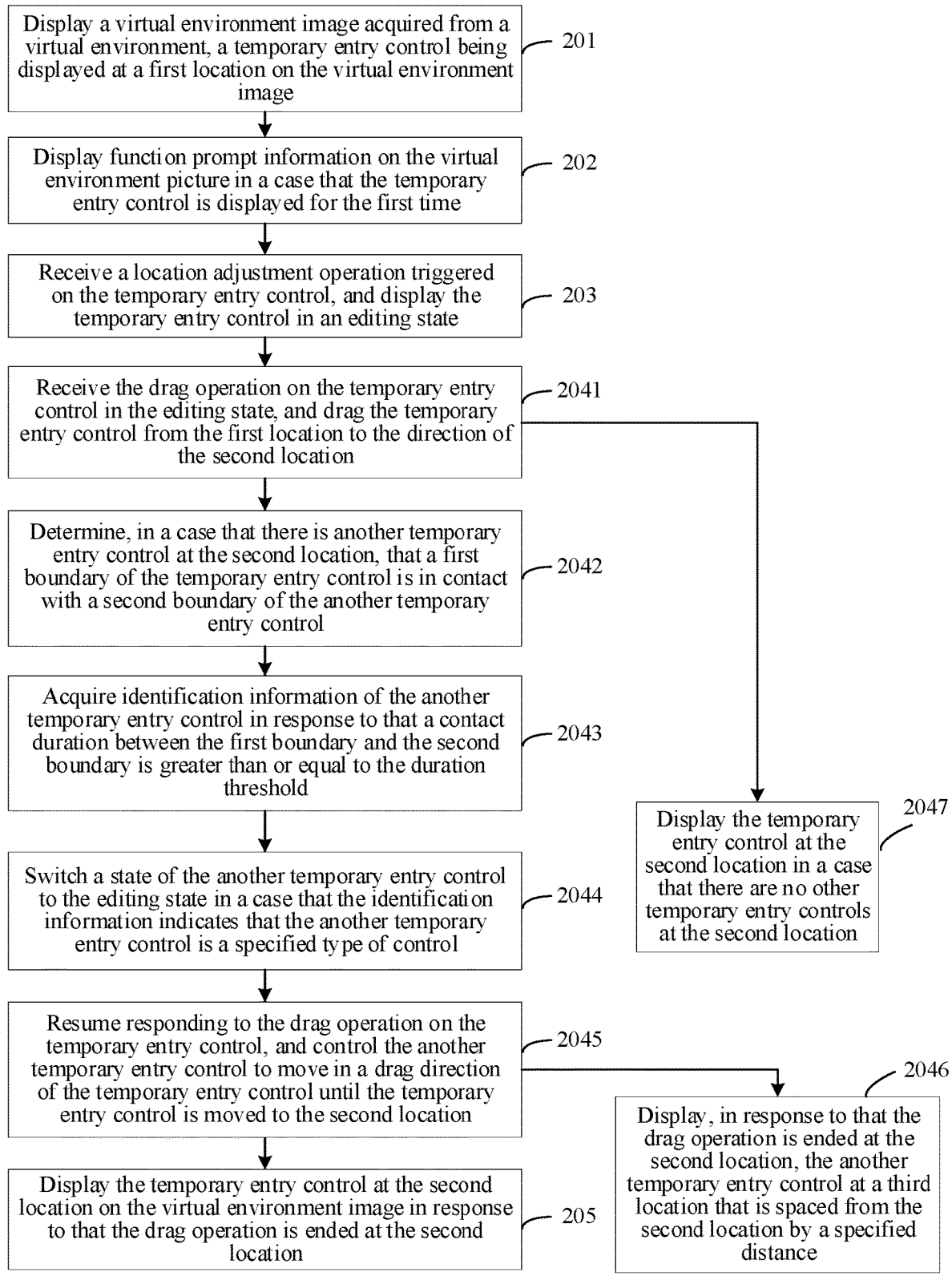
FIG. 8 is a flowchart of a location adjustment method for a control in an application according to another example embodiment.

In some other embodiments, the temporary entry control may further promote movement of another temporary entry control. For example, as shown in FIG. 8, step 204 may include step 2041 to step 2045, as shown below:

Step 2041. Receive the drag operation on the temporary entry control in the editing state, and drag the temporary entry control from the first location to the direction of the second location.

For example, after receiving the drag operation on the temporary entry control in the editing state, the terminal moves the temporary entry control from the first location to the direction of the second location according to a drag track of the finger on the screen of the terminal.

Step 2042. Determine, when there is another temporary entry control at the second location, that a first boundary of the temporary entry control is in contact with a second boundary of the another temporary entry control.

The terminal determines that there is the another temporary entry control at the second location, and sets the first boundary of the temporary entry control to be in contact with the second boundary of the another temporary entry control when the temporary entry control moves from the first location to the second location until a boundary of the temporary entry control is adjacent to a boundary of the another temporary entry control, or until the boundary of the temporary entry control overlaps the boundary of the another temporary entry control. The first boundary and the second boundary may be in contact through a point or an edge.

For example, the terminal uses a point on the temporary entry control as a starting point, emits a detection line in a movement direction of the temporary entry control, and detects whether there is another control in the movement direction of the temporary entry control through the detection line; determines whether the another control is the another temporary entry control in the presence of another control; and detects, when the another control is the another temporary entry control, that the moving temporary entry control collides with the another temporary entry control, that is, the first boundary of the temporary entry control is in contact with the second boundary of the another temporary entry control.

Step 2043. Acquire identification information of the another temporary entry control in response to that a contact duration between the first boundary and the second boundary is greater than or equal to the duration threshold.

For example, the duration threshold is set in the terminal, and the duration threshold may be three seconds; and the terminal searches for the identification information from the configuration information of the another temporary entry control when the contact duration between the first boundary and the second boundary is greater than three seconds.

Step 2044. Switch a state of the another temporary entry control to the editing state when the identification information indicates that the another temporary entry control is a specified type of control.

The terminal switches the state of another temporary entry control to the editing state when determining, based on the identification information, that the another temporary entry control is a specified type of control. A specified type of control is a control with a location adjustment function. In some embodiments, the specified type of control is the entry control for the temporary operational activities.

For example, the configuration information of the control includes a control identifier. The terminal finds the control identifier from the configuration information of the another temporary entry control, recognizes a type of the another temporary entry control based on the control identifier, and switches the state of the another temporary entry control to the editing state when the another temporary entry control is the specified type of control. The terminal further changes the display state of the another temporary entry control, for example, changes the filling color of the icon of the temporary entry control while changing the state.

Step 2045. Resume responding to the drag operation on the temporary entry control, and control the another temporary entry control to move in a drag direction of the temporary entry control until the temporary entry control is moved to the second location.

The temporary entry control and the another temporary entry control maintain a positional relationship of being in contact with each other in a drag process. After triggering the location adjustment function of the another temporary entry control, the terminal drags the temporary entry control, pushes the another temporary entry control through the temporary entry control, and controls the another temporary entry control to move in the drag direction of the temporary entry control until the temporary entry control is dragged to the second location, and step 204 is performed. That is, the temporary entry control and the another temporary entry control in the contact state are used as a whole to respond to the drag operation, and the whole is controlled to move in the drag direction, and then step 204 is performed.

While the temporary entry control is placed, the processing of the another temporary entry control that is also moved is described in step 2046 in FIG. 8, as shown below:

Step 2046. Display, in response to that the drag operation is ended at the second location, the another temporary entry control at a third location that is spaced from the second location by a specified distance.

A specified distance is set in the terminal, and the specified distance is used for determining a position at which the another temporary entry control is placed. In response to that the drag operation is ended at the second location on the temporary entry control, the terminal determines the third location that is spaced from the second location by the specified distance in the drag direction before the drag operation is ended while placing the temporary entry control at the second location, and displays the another temporary entry control in a state at the third location. In some embodiments, the specified distance is used for indicating a distance between contact points of the first boundary and the second boundary; or, the specified distance is used for indicating a distance between center points of the two controls.

This embodiment further includes a case that there are no other temporary entry controls at the second location. In this case, step 2047 in FIG. 8 is performed, as shown below:

Step 2047. Display the temporary entry control at the second location when there are no other temporary entry controls at the second location.

The terminal directly displays the temporary entry control at the second location when there are no other temporary entry controls laid out at the second location.

Figure 9:
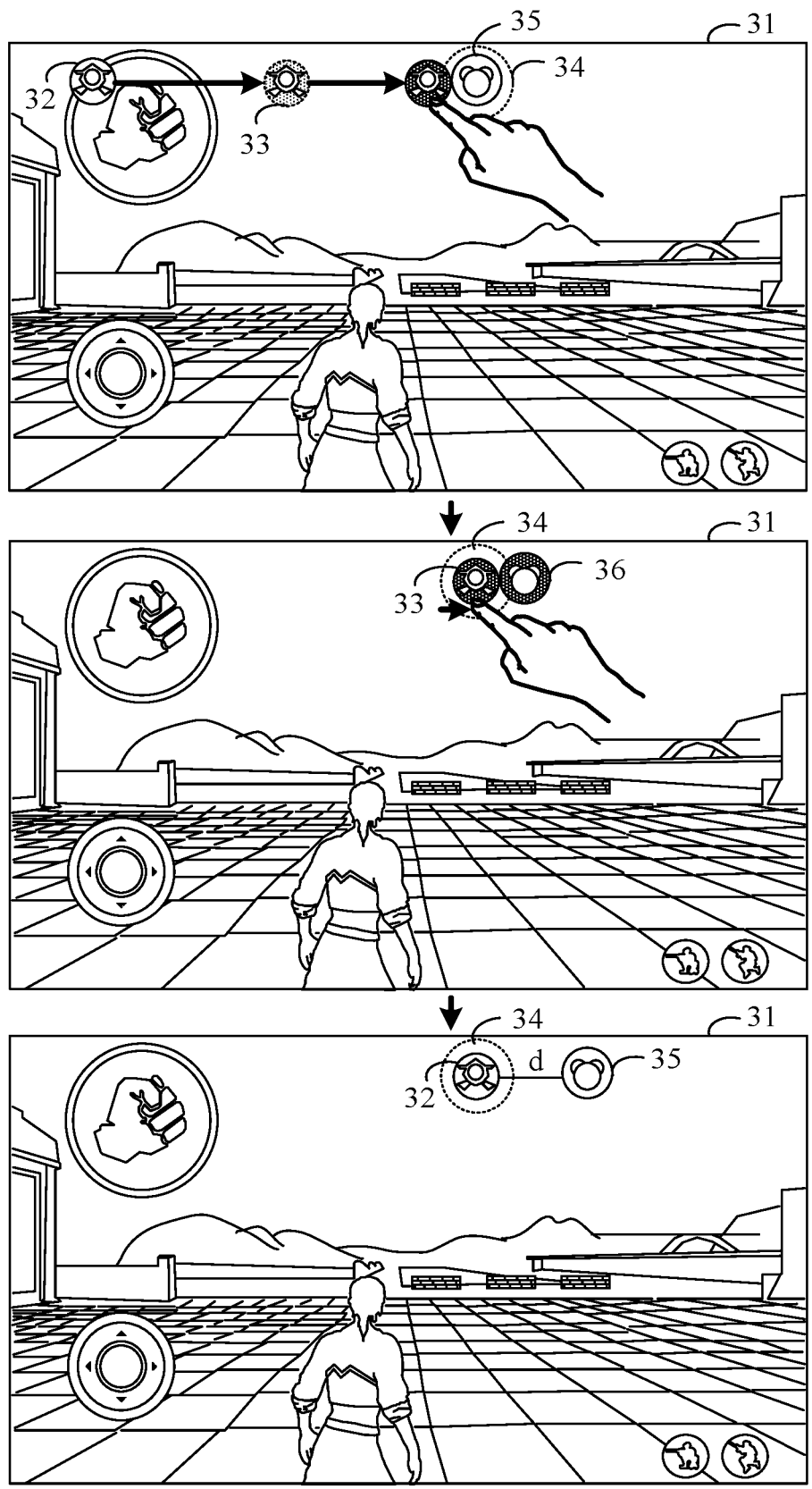
FIG. 9 is a schematic diagram of an interface of location adjustment for a control according to another example embodiment.

For example, as shown in FIG. 9, a temporary entry control 32 is displayed on a virtual environment picture 31. The terminal receives the long-press operation on the temporary entry control 32, to trigger the location adjustment for the temporary entry control 32, and the temporary entry control 32 is changed to a temporary entry control 33 in the editing state. After the location adjustment function of the temporary entry control 33 is triggered, the finger does not leave the screen, and drags the temporary entry control 33 from the first location to the right, until the temporary entry control 33 is dragged to be in contact with another temporary entry control 35 at a second location 34. After the temporary entry control 34 is in contact with the another temporary entry control 35 for three seconds, the another temporary entry control 35 is changed to another temporary entry control 36 in the editing state. The temporary entry control 33 continues to move toward the second location 34, while the another temporary entry control 36 also moves to the right. When the temporary entry control 33 moves to the second location 34, the finger leaves the screen and the drag operation is ended, and the temporary entry control 32 in the non-editing state is displayed at the second location 34. In addition, at a third location that is spaced from the second location by d centimeters on the right side of the temporary entry control 32, the another temporary entry control 35 in the non-editing state is displayed, where d is a positive integer.

In summary, according to the location adjustment method for a control in an application provided in this embodiment, the location adjustment for the another temporary entry control at the second location can be triggered while the location of the temporary entry control is adjusted, without aborting the current adjustment for the temporary entry control. The another temporary entry control at the second location is first adjusted, and then the temporary entry control is adjusted again. The temporary entry control and the another temporary entry control may be directly moved as a whole, which improves the efficiency of the location adjustment for the temporary entry control and the another temporary entry control. In addition, for the final placement of the two controls, the temporary entry control is placed spaced from the another temporary entry control by a distance, which can avoid erroneous touch of the another control while operating one control due to the close proximity between the two controls.

In another embodiment, the terminal may further receive a location restoration operation on the temporary entry control, and acquire the second location at which the temporary entry control is located; and restore the temporary entry control from the second location to the first location for display when the second location is a customized location. For example, the terminal receives a double-tap operation on the temporary entry control. After the double-tap operation, the finger immediately leaves the screen. The terminal determines that the second location of the temporary entry control is the customized location, and moves the temporary entry control from the second location to the original location (that is, the first location) for display. The original location is a default display location of the temporary entry control in the terminal. In some embodiments, the terminal may further move the temporary entry control from the second location to a fourth location when the second location is the customized location, where the fourth location is a last location at which the temporary entry control is placed.

In this method, the display location of the temporary entry control can be accurately and quickly restored to the original location when the user wants to restore the location of the temporary entry control to the original location, avoiding inaccuracy of the restoration location and more wasted time caused by manual restoration of the user.

In another embodiment, the terminal may not display the temporary entry control on the virtual environment picture. For example, the foregoing steps may be implemented in the following two manners:

1. The terminal cancels the display of the temporary entry control on the virtual environment picture in response to a hiding operation on the temporary entry control.

For example, after the terminal cancels the display of the temporary entry control on the virtual environment picture, the temporary entry control still exists on the setting interface. The terminal receives the display operation of the temporary entry control on the setting interface, and then redisplays the temporary entry control on the virtual environment picture.

For example, the hiding operation may include at least one of a long-press operation, a single-finger double-tap operation, a two-finger double-tap operation, and a hovering operation.

2. The terminal deletes, in response to a deletion operation on the temporary entry control, the temporary entry control in the application, and cancels the display of the temporary entry control on the virtual environment picture.

For example, the temporary entry control cannot be restored after the temporary entry control is deleted in the application. For example, the terminal further deletes update information associated with the temporary entry control while deleting the temporary entry control in the application.

The foregoing method of canceling the display of the temporary entry control enables the user to directly operate to no longer display the temporary entry control when determining that the corresponding function of the temporary entry control is not needed.

In another embodiment, the terminal may further display the function prompt information on the virtual environment picture when there is an overlapping region between a first region of the temporary entry control and a second region of the another control, to prompt the user that the temporary entry control has a customization location function. The location of the temporary entry control may be adjusted, so that there is no overlapping region between the temporary entry control and the another control, avoiding erroneous touch of the another control while using one of the temporary entry control and the another control.

In another embodiment, the terminal may further reset the display priority of the temporary entry control when there is an overlapping region between the first region of the temporary entry control and the second region of the another control, to ensure the display priority of the temporary entry control or the another control.

The terminal displays a reset interface in the application when there is an overlapping region between the first region of the temporary entry control and the second region of the another control, where the reset interface includes a reset control that displays the priority; determines whether a first display priority of the temporary entry control is higher than a second display priority of the another control in response to a reset operation on the reset control; resets the first display priority to a third display priority when the first display priority is higher than the second display priority, where the third display priority is lower than the second display priority; and resets the first display priority to a fourth display priority when the first display priority is lower than the second display priority, where the fourth display priority is higher than the second display priority.

For example, the terminal sets, in response to the reset operation on the reset control, the display priority of the temporary entry control to the third display priority that is one level lower than the second display priority when the first display priority is higher than the second display priority; and sets the display priority of the temporary entry control to the fourth display priority that is one level higher than the second display priority when the first display priority is lower than the second display priority.

For example, the terminal disables the another control when there is an overlapping region between the temporary entry control and the another control and the display priority of the temporary entry control is higher than the display priority of the another control; and disables the temporary entry control when there is an overlapping region between the temporary entry control and the another control and the display priority of the temporary entry control is lower than the display priority of the another control.

The first region is the display region of the temporary entry control on the virtual environment picture, and the second region is the display region of the another control on the virtual environment picture.

This method enables the user to set the display priority of the temporary entry control to be higher or lower than the display priority of the another control according to own requirements when there is an overlapping region between the temporary entry control and the another control.

In another embodiment, at least two temporary entry controls are included on the virtual environment picture. The terminal folds the at least two temporary entry controls into an integrated entry control in response to a folding operation for the at least two temporary entry controls, and assigns a trigger operation to each temporary entry control, different temporary entry controls being corresponding to different trigger operations; and displays assignment information after assigning the trigger operations to the temporary entry controls, the assignment information being used for informing the user of the trigger operation corresponding to each temporary entry control. For example, a temporary entry control 1 corresponds to the long-press operation, and the terminal receives the long-press operation on the integrated entry control, and triggers a function corresponding to the temporary entry control 1; and a temporary entry control 2 corresponds to the double-tap operation, and the terminal receives the double-tap operation on the integrated entry control, and triggers a function corresponding to the temporary entry control 2.

In another embodiment, the temporary entry control is valid within a preset time period. The preset time period includes an end moment. The terminal calculates a duration between a display moment and the end moment of the temporary entry control, determines a display transparency corresponding to the duration according to a mapping relationship, and displays the temporary entry control according to the display transparency, where the mapping relationship is a correspondence between the duration and the display transparency, and the duration and the display transparency have a negative correlation.

Figure 10:
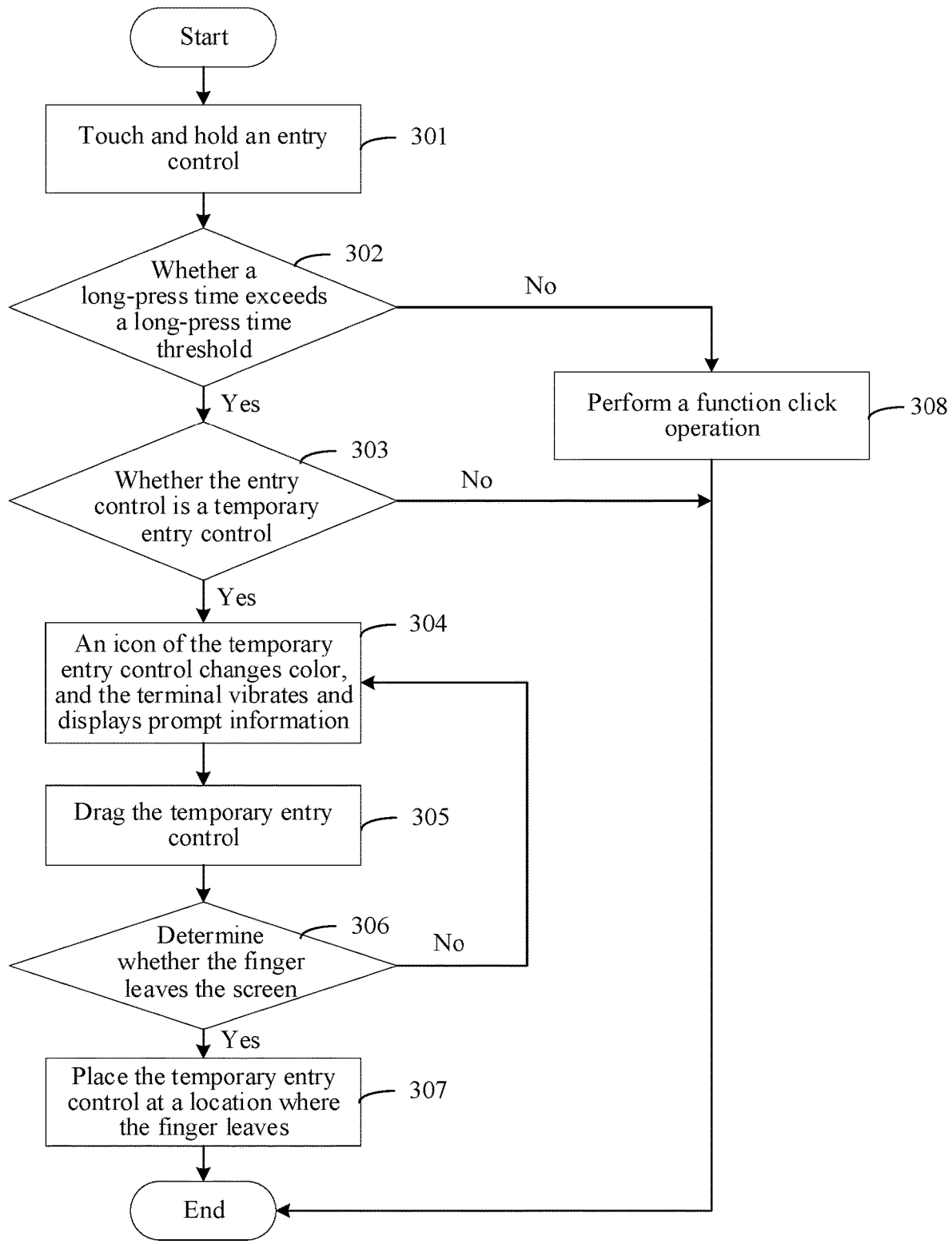
FIG. 10 is a flowchart of a location adjustment method for a control in an application according to another example embodiment.

FIG. 10 is a flowchart of a location adjustment method for a control in an application according to one example embodiment. The method is applicable to the first terminal 120 or the second terminal 160 in the computer system 100 shown in FIG. 1, or another terminal in the computer system. The method includes the following steps:

Step 301. Touch and hold an entry control.

The terminal displays the entry control on a virtual environment picture. The user touches and holds the entry control, and correspondingly, the terminal receives a long-press operation on the entry control.

Step 302. Determine whether a long-press time exceeds a long-press time threshold.

The terminal is preset with the long-press time threshold (that is, a first specified duration), that is, a critical value of the long-press time. The terminal counts the long-press time after receiving the long-press operation on the entry control, to determine whether the long-press time exceeds the long-press time threshold, performs step 303 when the long-press time exceeds the long-press time threshold, and performs step 308 when the long press time does not exceed the long press time threshold.

Step 303. Determine whether the entry control is a temporary entry control.

The terminal recognizes whether the entry control is a temporary entry control after determining that the long-press time exceeds the long-press time threshold. The terminal performs step 304 when determining that the entry control is a temporary entry control; and ends the location adjustment for the entry control when determining that the entry control is not a temporary entry control.

Step 304. An icon of the temporary entry control changes color, and the terminal vibrates and displays prompt information (that is, state prompt information).

When determining that the entry control is a temporary entry control, the terminal switches the icon color of the temporary entry control, controls own vibration, displays the prompt information to prompt that the drag function of the temporary entry control (that is, the location adjustment function of the temporary entry control) is activated, and continues to perform step 305.

Step 305. Drag the temporary entry control.

The terminal receives the drag operation triggered on the temporary entry control, to drag the temporary entry control from one location to another location.

Step 306. Determine whether the finger leaves the screen.

The terminal determines whether the finger leaves the screen, and ends the drag operation for the temporary entry control when the finger leaves the screen. When determining that the finger leaves the screen, the terminal performs step 307 when determining that the drag operation for the temporary entry control is ended; and continues to perform step 304 when determining that the drag operation for the temporary entry control is not ended, and maintains the icon of the temporary entry control in the color-changed state. For example, the terminal may not continue to vibrate and may not continue to display the prompt information. For example, the prompt information may no longer be displayed after a preset time period from the beginning of the display.

Step 307. Place the temporary entry control at a location where the finger leaves.

The terminal places, after determining that the finger leaves the screen, the temporary entry control at the location where the finger leaves (that is, a second location), to complete the location adjustment for the temporary entry control.

Step 308. Perform a function click operation.

The terminal performs processing according to the functional click operation when determining that the long-press time does not exceed the long-press time threshold, to trigger a function supported by the temporary entry control. For example, the temporary entry control is an entry of a May 1st activity. The terminal enters a May 1st activity interface from the virtual environment picture when performing processing according to the functional click operation, and ends the location adjustment for the temporary entry control.

In summary, according to the location adjustment method for a control in an application provided in this embodiment, a location adjustment function is provided for the temporary entry control superimposed and displayed on the virtual environment picture. The location adjustment for the temporary entry control may be directly triggered on the virtual environment picture, and the temporary entry control may be dragged from one location to another location, so that the location adjustment for the temporary entry control is implemented without entering a setting interface of an application, which simplifies a process of the location adjustment for the temporary entry control, and improves the efficiency of man-machine interaction.

Figure 11:
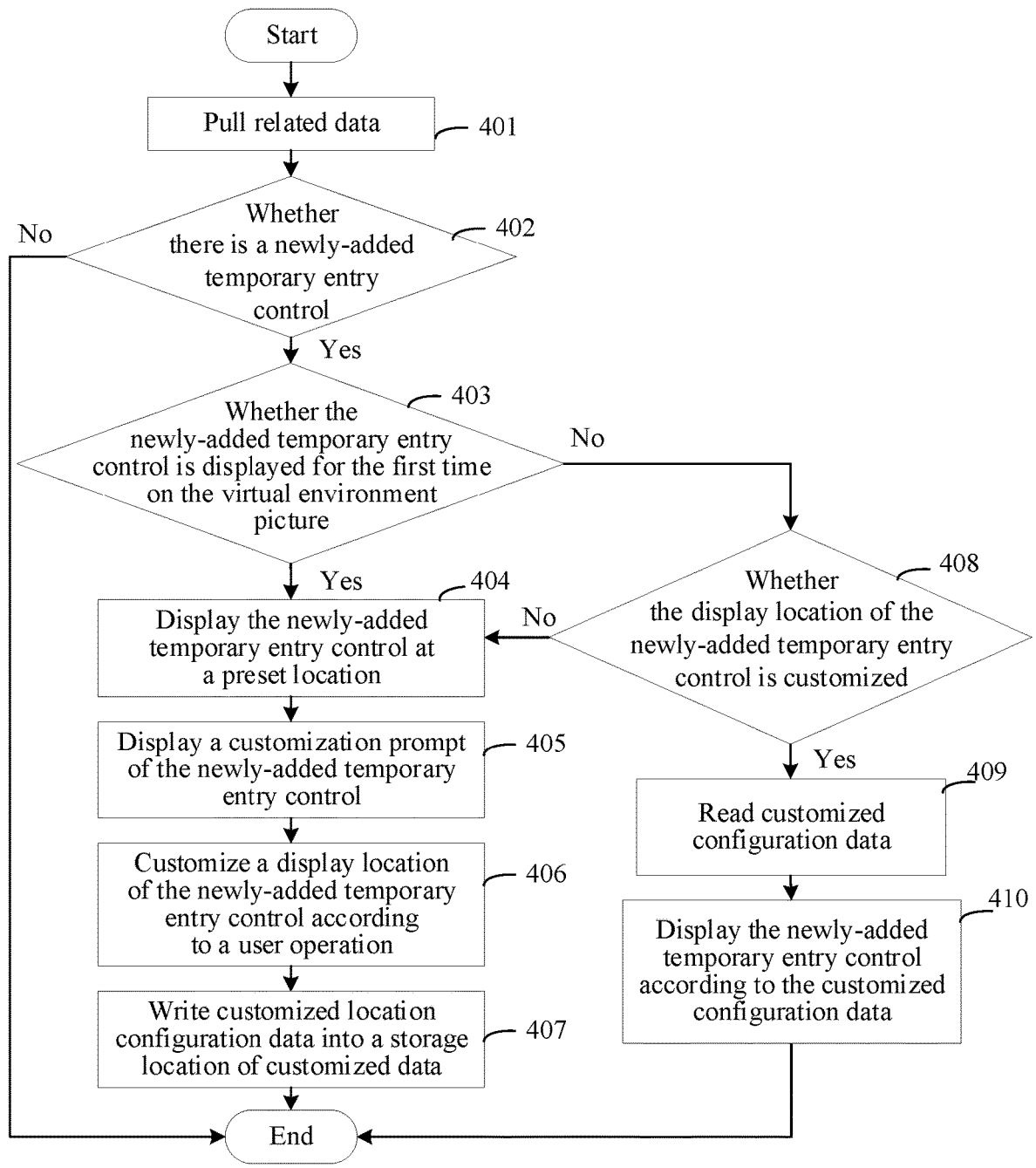
FIG. 11 is a flowchart of a location adjustment method for a control in an application according to another example embodiment.

FIG. 11 is a flowchart of a location adjustment method for a control in an application according to one example embodiment. The method is applicable to the first terminal 120 or the second terminal 160 in the computer system 100 shown in FIG. 1, or another terminal in the computer system. The method includes the following steps:

Step 401. Pull related data.

The terminal pulls, when starting to run an application supporting the virtual environment, related data of the application, where the related data includes pictures and controls that need to be displayed on a UI.

Step 402. Determine whether there is a newly-added temporary entry control.

The terminal determines whether there is a newly-added temporary entry control in the related data, where the newly-added temporary entry control is a temporary entry control newly-added in an updated application version. In some embodiments, the newly-added temporary entry control may be the entry control for temporary operational activities. The terminal performs step 403 when determining that there is a newly-added temporary entry control; and ends a related operation on the temporary entry control when determining that there is no newly-added temporary entry control. The newly-added temporary entry control is displayed on the virtual environment picture.

Step 403. Determine whether the newly-added temporary entry control is displayed for the first time on the virtual environment picture.

The terminal determines whether the newly-added temporary entry control is displayed for the first time on the virtual environment picture; performs step 404 to step 407 when the newly-added temporary entry control is displayed for the first time on the virtual environment picture; and performs step 408 when the newly-added temporary entry control is not displayed for the first time on the virtual environment picture.

Step 404. Display the newly-added temporary entry control at a preset location.

The terminal displays the newly-added temporary entry control at the preset location (that is, the original location), where the preset location is a default display location of the newly-added temporary entry control on the virtual environment picture. For example, location configuration data of the preset location of the newly-added temporary entry control is acquired from a storage location of preset data when the terminal determines that the newly-added temporary entry control is displayed for the first time on the virtual environment picture. Based on the location configuration data of the preset location, the newly-added temporary entry control is displayed at the preset location on the virtual environment picture.

Step 405. Display a customization prompt of the newly-added temporary entry control.

For example, the terminal displays the customization prompt of the newly-added temporary entry control while displaying the newly-added temporary entry control at the preset location. The terminal displays the customization prompt (that is, the function prompt information) when the newly-added temporary entry control is displayed for the first time. For example, as shown in FIG. 3, the newly-added temporary entry control 12 is displayed on the virtual environment picture 11, and "Press and drag to customize a location of the activity entry" is displayed on the right side of the newly-added temporary entry control 12.

Step 406. Customize a display location of the newly-added temporary entry control according to a user operation.

The terminal changes the display location of the newly-added temporary entry control according to the drag operation of the user, drags the newly-added temporary entry control from the first location to the second location, and places the newly-added temporary entry control at the second location.

Step 407. Write customized location configuration data into a storage location of customized data.

For example, after placing the newly-added temporary entry control at the second location, the terminal stores the location configuration data of the customized second location and the control identifier of the newly-added temporary entry control into the corresponding storage location of the customized data, to complete the location adjustment for the newly-added temporary entry control. For example, the storage location of the customized data is different from a data storage location of the original location.

Step 408. Determine whether the display location of the newly-added temporary entry control is customized.

The terminal determines whether the display location of the newly-added temporary entry control is customized when determining that the newly-added temporary entry control is not displayed for the first time on the virtual environment picture; performs step 409 and step 410 when the display location of the newly-added temporary entry control is customized; and performs step 404 to step 407 when the display location of the newly-added temporary entry control is not customized.

Step 409. Read customized configuration data.

The customized configuration data is location configuration data of the newly-added temporary entry control after the location customization. The terminal reads the customized configuration data of the newly-added temporary entry control from the storage location of the customized data when the display location of the newly-added temporary entry control is customized.

Step 410. Display the newly-added temporary entry control according to the customized configuration data.

The terminal displays the newly-added temporary entry control on the virtual environment picture according to the customized configuration data of the newly-added temporary entry control.

In summary, according to the location adjustment method for a control in an application provided in this embodiment, a location adjustment function is provided for the temporary entry control superimposed and displayed on the virtual environment picture. The location adjustment for the temporary entry control may be directly triggered on the virtual environment picture, and the temporary entry control may be dragged from one location to another location, so that the location adjustment for the temporary entry control is implemented without entering a setting interface of an application, which simplifies a process of the location adjustment for the temporary entry control, and improves the efficiency of man-machine interaction.

The following is an apparatus embodiment. For details not described in detail in the apparatus embodiment, reference may be made to corresponding record in the foregoing method embodiments. Details described for different embodiments may be relevant to each embodiment.

Figure 12:
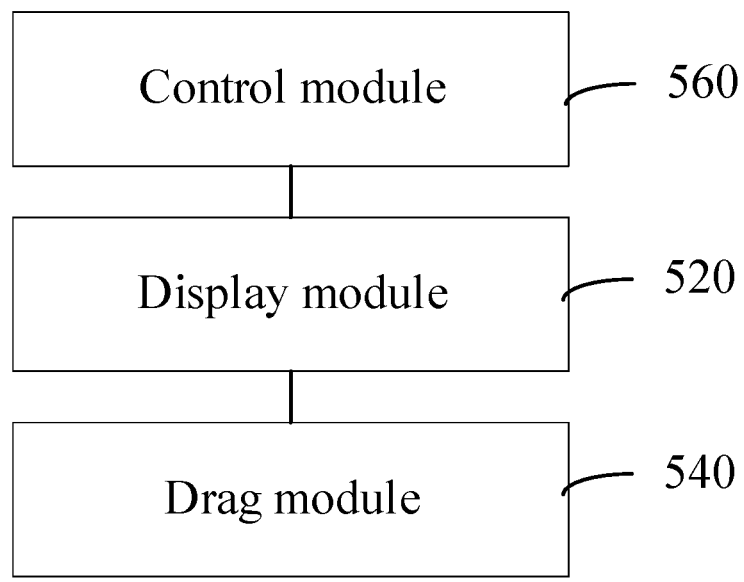
FIG. 12 is a block diagram of a location adjustment apparatus for a control in an application according to one example embodiment.

FIG. 12 is a block diagram of a location adjustment apparatus for a control in an application according to one example embodiment. The apparatus may be implemented as part or all of a computer device through software, hardware, or a combination thereof. The apparatus includes: a display module 520, configured to display a virtual environment picture acquired from a virtual environment, a temporary entry control being displayed at a first location on the virtual environment picture; the display module 520 being configured to display function prompt information on the virtual environment picture when the temporary entry control is displayed for a first time, the function prompt information being used for prompting that the temporary entry control has a location customization function; the display module 520 being configured to receive a location adjustment operation triggered on the temporary entry control, and display the temporary entry control in an editing state; a drag module 540, configured to receive a drag operation on the temporary entry control in the editing state, and drag the temporary entry control from the first location to a second location; and the display module 520 being configured to display the temporary entry control at the second location on the virtual environment picture in response to that the drag operation is ended at the second location.

In some embodiments, the display module 520 is configured to receive the location adjustment operation triggered on the temporary entry control, and acquire historical running information of an application; and display the temporary entry control in the editing state when the historical running information indicates that the temporary entry control is displayed for the first time.

In some embodiments, the display module 520 is configured to acquire configuration information of the temporary entry control; and display the temporary entry control in the editing state when the configuration information indicates that the temporary entry control is an entry control for a temporary operational activity, the temporary operational activity being an operational activity organized for a virtual object in the virtual environment.

In some embodiments, the display module 520 is configured to switch a first filling element of the temporary entry control to a second filling element, the second filling element being used for indicating that the temporary entry control is in the editing state.

In some embodiments, the display module 520 is configured to determine, in response to the location adjustment operation, that the temporary entry control is displayed for the first time, and display state prompt information, the state prompt information being used for prompting that the temporary entry control is in the editing state.

In some embodiments, the apparatus further includes a control module 560.

The control module 560 is configured to determine, in response to the location adjustment operation, that the temporary entry control is displayed for the first time, and control a vibrator to perform a vibration action, the vibration action being used for prompting that the temporary entry control is in the editing state.

In some embodiments, the display module 520 is configured to acquire layout information at the second location in response to that the drag operation is ended at the second location; acquire, when the layout information indicates that there is another control at the second location, a first priority of the temporary entry control and a second priority of the another control; and superimpose and display the temporary entry control on the another control at the second location when the first priority is higher than the second priority.

In some embodiments, the drag module 540 is configured to drag the temporary entry control from the first location toward the second location; and determine, when there is another temporary entry control at the second location, that a first boundary of the temporary entry control is in contact with a second boundary of the another temporary entry control; the display module 520 is configured to acquire identification information of the another temporary entry control in response to that a contact duration between the first boundary and the second boundary is greater than a duration threshold; and switch a state of the another temporary entry control to the editing state when the identification information indicates that the another temporary entry control is a specified type of control; and the drag module 540 is configured to resume responding to the drag operation on the temporary entry control, to control the another temporary entry control to move in a drag direction of the temporary entry control until the temporary entry control is moved to the second location, the temporary entry control and the another temporary entry control maintaining a positional relationship of being in contact with each other in a drag process.

In some embodiments, the display module 520 is configured to display, in response to that the drag operation is ended at the second location, the another temporary entry control at a third location that is spaced from the second location by a specified distance.

In some embodiments, the display module 520 is configured to receive a location restoration operation on the temporary entry control, and acquire the second location at which the temporary entry control is located; and resume displaying the temporary entry control at the first location from the second location when the second location is a customized location.

In some embodiments, the display module 520 is configured to display the function prompt information on the virtual environment picture when there is an overlapping region between a first region of the temporary entry control and a second region of another control, the first region being a display region of the temporary entry control on the virtual environment picture, and the second region being a display region of the another control on the virtual environment picture.

In some embodiments, the display module 520 is configured to display a reset interface in the application when there is an overlapping region between a first region of the temporary entry control and a second region of another control, the reset interface including a reset control for displaying a priority; the control module 560 is configured to determine, in response to a reset operation on the reset control, whether a first display priority of the temporary entry control is higher than a second display priority of the another control; reset the first display priority to a third display priority when the first display priority is higher than the second display priority, the third display priority being lower than the second display priority; and reset the first display priority to a fourth display priority when the first display priority is lower than the second display priority, the fourth display priority being higher than the second display priority, the first region being a display region of the temporary entry control on the virtual environment picture, and the second region being a display region of the another control on the virtual environment picture.

In summary, according to the location adjustment apparatus for a control in an application provided in this embodiment, the location adjustment function is provided for the temporary entry control superimposed and displayed on the virtual environment picture. The location adjustment for the temporary entry control may be directly triggered when the temporary entry control is displayed on the virtual environment picture for the first time. The temporary entry control is dragged from the first location to the second location, so that the location adjustment for the temporary entry control is implemented without entering a setting interface of an application, and the location adjustment of the control may be completed only by using two operations of a trigger operation and a drag operation of the location adjustment, which greatly simplifies operation steps of the location adjustment for the temporary entry control, and improves the efficiency of man-machine interaction.

The location adjustment apparatus for a control in an application provided in the foregoing embodiments is illustrated with an example of division of the functional modules. In actual application, the functions may be allocated to and completed by different functional modules according to requirements, that is, the internal structure of the apparatus is divided into different functional modules, to implement all or some of the functions described above. In addition, the location adjustment apparatus for a control in an application provided in the foregoing embodiments and the location adjustment method for a control in an application according to the embodiments belong to the same concept. For the example embodiments, reference may be made to the other method embodiments described herein.

Figure 13:
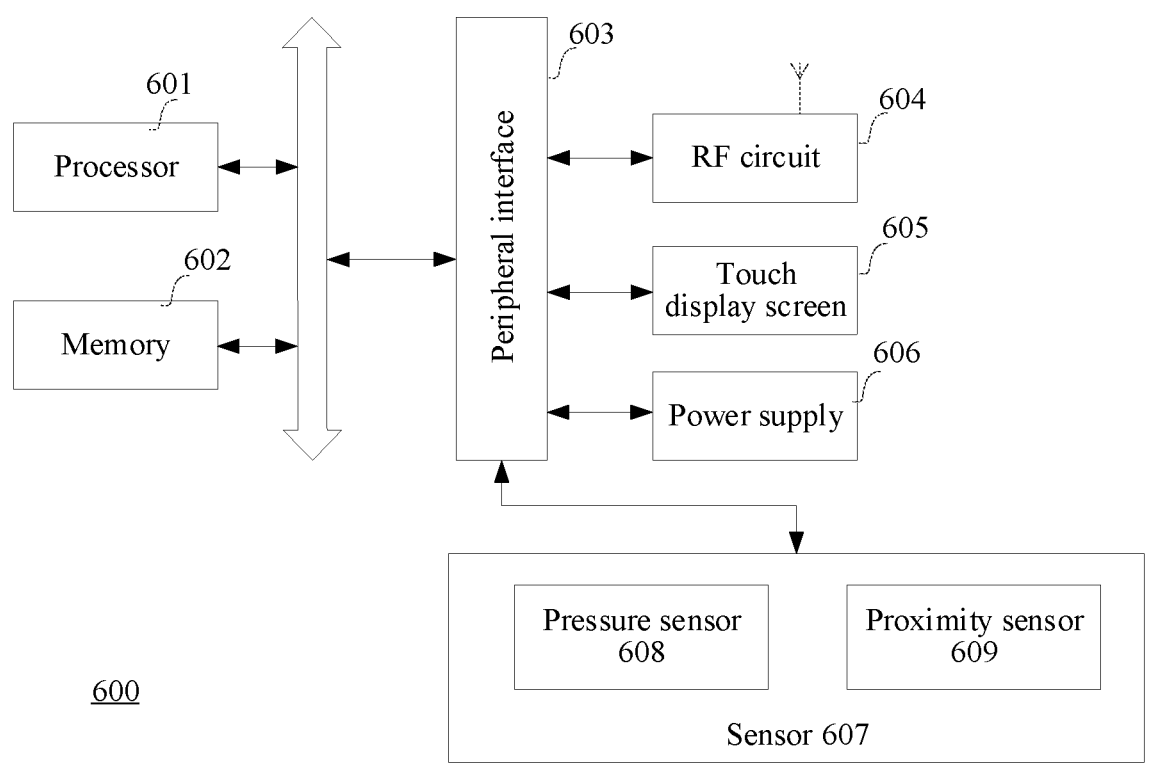
FIG. 13 is a schematic structural diagram of a computer device according to one example embodiment.

FIG. 13 is a structural block diagram of a computer device 600 according to one example embodiment. The computer device 600 may be a portable mobile terminal, for example, a smartphone, a tablet computer, an MP3 player, and an MP4 player. The computer device 600 may be further referred to as another name such as user equipment or a portable terminal.

Generally, the computer device 600 includes a processor 601 and a memory 602. The processor 601 may include one or more processing cores, and may be, for example, a 4-core processor or an 8-core processor. The processor 601 may be implemented by using at least one hardware form of a digital signal processor (DSP), a field-programmable gate array (FPGA), and a programmable logic array (PLA). The processor 601 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 601 may be integrated with a graphics processing unit (GPU). The GPU is configured to be responsible for rendering and drawing content to be displayed by a display screen. In some embodiments, the processor 601 may further include an artificial intelligence (AI) processor. The AI processor is configured to process a calculation operation related to machine learning.

The memory 602 may include one or more computer-readable storage media. The computer-readable storage medium may be tangible and non-transient. The memory 602 may further include a high-speed random access memory (RAM) and a non-volatile memory, for example, one or more disk storage devices or flash memory devices. In some embodiments, the non-transitory computer-readable storage medium in the memory 602 is configured to store at least one instruction, the at least one instruction being executed by the processor 601 to implement the location adjustment method for a control in an application provided in the embodiments.

In some embodiments, the computer device 600 further In some embodiments includes a peripheral interface 603 and at least one peripheral device. In some embodiments, the peripheral device includes: at least one of a radio frequency (RF) circuit 604, a touch display screen 605, and a power supply 606.

The peripheral interface 603 may be configured to connect at least one peripheral related to input/output (I/O) to the processor 601 and the memory 602. In some embodiments, the processor 601, the memory 602, and the peripheral interface 603 are integrated on the same chip or circuit board. In some other embodiments, any one or two of the processor 601, the memory 602, and the peripheral interface 603 may be implemented on a separate chip or the circuit board. These are merely examples and other examples in additional embodiments are included.

The RF circuit 604 is configured to receive and transmit an RF signal, which is also referred to as an electromagnetic signal. The RF circuit 604 communicates with a communication network and another communication device by using the electromagnetic signal. The RF circuit 604 converts an electric signal into an electromagnetic signal for transmission, or converts a received electromagnetic signal into an electric signal. In some embodiments, the RF circuit 604 includes an antenna system, an RF transceiver, one or more amplifiers, a tuner, an oscillator, a DSP, a codec chip set, a subscriber identity module card, and the like. The RF circuit 604 may communicate with another terminal by using at least one wireless communication protocol. The wireless communication protocol includes, but is not limited to: a world wide web, a metropolitan area network, an intranet, generations of mobile communication networks (2G, 3G, 4G, 5G and a combination thereof), a wireless local area network and a wireless fidelity (Wi-Fi) network. In some embodiments, the RF circuit 604 may further include a circuit related to near field communication (NFC), which is merely one example and other examples in additional embodiments are included.

The touch display screen 605 is configured to display a UI. The UI may include a graph, text, an icon, a video, and any combination thereof. The touch display screen 605 also has a capability of collecting a touch signal on or above a surface of the touch display screen 605. The touch signal may be inputted into the processor 601 as a control signal for processing. The touch display screen 605 is configured to provide a virtual button and/or a virtual keyboard, which is also referred to as a soft button and/or a soft keyboard. In some embodiments, there is one touch display screen 605, disposed on a front panel of the computer device 600. In some other embodiments, there may be at least two touch display screens 605, respectively disposed on different surfaces of the computer device 600 or designed in a foldable shape. In still some other embodiments, the touch display screen 605 may be a flexible display screen, disposed on a curved surface or a folded surface of the computer device 600. Even, the touch display screen 605 may be further set in a non-rectangular irregular pattern, namely, a special-shaped screen. The touch display screen 605 may be made of a material such as a liquid crystal display (LCD) or an organic light-emitting diode (OLED).

The power supply 606 is configured to supply power to components in the computer device 600. The power supply 606 may be an alternating current, a direct current, a primary battery, or a rechargeable battery. When the power supply 606 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the computer device 600 further includes one or more sensors 607. The one or more sensors 607 include, but are not limited to, a pressure sensor 608 and a proximity sensor 609.

The pressure sensor 608 may be disposed on a side frame of the computer device 600 and/or a lower layer of the touch display screen 605. A holding signal of the user on the computer device 600 may be detected when the pressure sensor 608 is disposed at the side frame of the computer device 600, and left/right hand identification and a quick operation may be performed according to the holding signal. When the pressure sensor 608 is disposed at the lower layer of the touch display screen 605, an operable control on the UI interface may be controlled according to a pressure operation of the user on the touch display screen 605. The operable control includes at least one of a button control, a scroll-bar control, an icon control, and a menu control.

The proximity sensor 609, also referred to as a distance sensor, is usually disposed on the front panel of the computer device 600. The proximity sensor 609 is configured to collect a distance between a front face of the user and the front face of the computer device 600. In an embodiment, when the proximity sensor 609 detects that the distance between the front face of the user and the front face of the computer device 600 is gradually decreased, the processor 601 controls the touch display screen 605 to switch from a screen-on state to a screen-off state. When the proximity sensor 609 detects that the distance between the front face of the user and the front face of the computer device 600 is gradually increased, the processor 601 controls the touch display screen 605 to switch from the screen-off state to the screen-on state.

A person skilled in the art may understand that the structure shown in FIG. 13 is merely one example of the computer device 600, and the computer device may include more components or fewer components than those shown in the figure, or some components may be combined, or a different component deployment may be used.

An embodiment further provides a computer device including a processor and a memory, the memory storing at least one instruction, at least one segment of program, a code set or an instruction set, the at least one instruction, the at least one segment of program, the code set or the instruction set being loaded and executed by the processor to implement the location adjustment method for a control in an application provided in the foregoing method embodiments.

An embodiment further provides a computer-readable storage medium, storing at least one instruction, at least one program, a code set, or an instruction set, the at least one instruction, the at least one program, the code set, or the instruction set being loaded and executed by a processor to implement the location adjustment method for a control in an application provided in the foregoing method embodiments.

An embodiment further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the location adjustment method for a control in an application described in the foregoing aspect.

It is to be understood that "plurality of" mentioned in this specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

We claim:

1. A location adjustment method comprising:
   displaying a virtual environment picture acquired from a virtual environment, a temporary entry control being displayed at a first location on the virtual environment picture;
   displaying function prompt information on the virtual environment picture in response to the temporary entry control being displayed for a first time, the function prompt information being configured for prompting that the temporary entry control has a location customization function;
   receiving a location adjustment operation triggered on the temporary entry control;
   displaying the temporary entry control in an editing state;
   receiving a drag operation on the temporary entry control in the editing state where the temporary entry control is dragged from the first location to a second location; and
   displaying the temporary entry control at the second location on the virtual environment picture in response to the drag operation.

2. The method according to claim 1, wherein the receiving a location adjustment operation, and the displaying the temporary entry control in an editing state further comprises:
   receiving the location adjustment operation and acquiring historical running information; and
   displaying the temporary entry control in the editing state when the historical running information indicates that the temporary entry control is displayed for the first time.

3. The method according to claim 2, wherein the displaying the temporary entry control in the editing state further comprises:
   acquiring configuration information of the temporary entry control; and
   displaying the temporary entry control in the editing state when the configuration information indicates that the temporary entry control is an entry control for a temporary operational activity, wherein the temporary operational activity is an operational activity organized for a virtual object in the virtual environment.

4. The method according to claim 1, wherein the displaying of the temporary entry control in the editing state comprises:
   switching a first filling element of the temporary entry control to a second filling element, the second filling element being configured for indicating that the temporary entry control is in the editing state.

5. The method according to claim 1, further comprising:
   determining, in response to the location adjustment operation, that the temporary entry control is displayed for the first time; and
   displaying state prompt information that is configured for prompting that the temporary entry control is in the editing state.

6. The method according to claim 1, further comprising:
   determining, in response to the location adjustment operation, that the temporary entry control is displayed for the first time; and
   controlling a vibrator to perform a vibration action for prompting that the temporary entry control is in the editing state.

7. The method according to claim 1, wherein the displaying the temporary entry control at the second location further comprises:
   acquiring layout information at the second location in response to that the drag operation;

acquiring, when the layout information indicates that there is another control at the second location, a first priority of the temporary entry control and a second priority of the another control; and displaying the temporary entry control superimposed on the another control at the second location when the first priority is higher than the second priority.

8. The method according to claim 1, wherein the drag operation of the temporary entry control from the first location to a second location further comprises:

dragging the temporary entry control from the first location toward the second location;

determining, when there is another temporary entry control at the second location, that a first boundary of the temporary entry control is in contact with a second boundary of the another temporary entry control;

acquiring identification information of the another temporary entry control in response to that a contact duration between the first boundary and the second boundary is greater than a duration threshold;

switching a state of the another temporary entry control to the editing state when the identification information indicates that the another temporary entry control is a specified type of control; and resuming responding to the drag operation on the temporary entry control, to control the another temporary entry control to move in a drag direction of the temporary entry control until the temporary entry control is moved to the second location, the temporary entry control and the another temporary entry control maintaining a positional relationship of being in contact with each other in a drag process.

9. The method according to claim 8, wherein the method further comprises:

displaying, in response to that the drag operation, the another temporary entry control at a third location that is spaced from the second location by a specified distance.

10. The method according to claim 1, further comprising:

receiving a location restoration operation on the temporary entry control;

acquiring the second location at which the temporary entry control is located; and resuming displaying of the temporary entry control at the first location from the second location when the second location is a customized location.

11. The method according to claim 7, further comprising:

displaying the function prompt information on the virtual environment picture when there is an overlapping region between a first region of the temporary entry control and a second region of another control, the first region being a display region of the temporary entry control on the virtual environment picture, and the second region being a display region of the another control on the virtual environment picture.

12. The method according to claim 7, further comprising:

displaying a reset interface when there is an overlapping region between a first region of the temporary entry control and a second region of another control, the reset interface comprising a reset control for displaying a priority;

determining, in response to a reset operation on the reset control, whether a first display priority of the temporary entry control is higher than a second display priority of the another control;

resetting the first display priority to a third display priority when the first display priority is higher than the second display priority, the third display priority being lower than the second display priority; and resetting the first display priority to a fourth display priority when the first display priority is lower than the second display priority, the fourth display priority being higher than the second display priority, wherein the first region is a display region of the temporary entry control on the virtual environment picture, and the second region is a display region of the another control on the virtual environment picture.

13. A computer device, comprising a processor and a memory, the memory storing at least one instruction, at least one program, a code set or an instruction set, the at least one instruction, the at least one program, the code set or the instruction set being loaded and executed by the processor to implement the location adjustment method according to claim 1.

14. A location adjustment apparatus for a control in an application, the apparatus comprising:

a processor;

a memory in communication with the processor; and wherein the processor is configured by instructions contained in the memory to:

cause a display device to display a virtual environment picture acquired from a virtual environment;

cause the display device to display a temporary entry control at a first location on the virtual environment picture;

cause the display device to display function prompt information on the virtual environment picture in response to the temporary entry control being displayed for a first time, wherein the function prompt information is configured for prompting that the temporary entry control has a location customization function;

receive a location adjustment operation triggered on the temporary entry control;

cause the display device to display the temporary entry control in an editing state;

receive a drag operation on the temporary entry control in the editing state;

drag the temporary entry control from the first location to a second location; and cause the display device to display the temporary entry control at the second location on the virtual environment picture in response to the drag operation ending at the second location.

15. The location adjustment apparatus according to claim 14, wherein for the receiving of the location adjust operation and for the displaying the temporary entry control in the editing state, the processor is further configured to:

receive the location adjustment operation and acquiring historical running information; and cause the display device to display the temporary entry control in the editing state when the historical running information indicates that the temporary entry control is displayed for the first time.

16. The location adjustment apparatus according to claim 15, wherein for the displaying the temporary entry control in the editing state, the processor is further configured to:

acquire configuration information of the temporary entry control; and cause the display device to display the temporary entry control in the editing state when the configuration information indicates that the temporary entry control is an entry control for a temporary operational activity, wherein the temporary operational activity is an operational activity organized for a virtual object in the virtual environment.

17. A non-transitory computer-readable storage medium, storing at least one instruction or program that is configured to be loaded and executed by a processor to cause the processor to implement operations comprising:
 displaying a virtual environment picture acquired from a virtual environment, a temporary entry control being displayed at a first location on the virtual environment picture;
 displaying function prompt information on the virtual environment picture in response to the temporary entry control being displayed for a first time, the function prompt information being configured for prompting that the temporary entry control has a location customization function;
 receiving a location adjustment operation triggered on the temporary entry control;
 displaying the temporary entry control in an editing state;
 receiving a drag operation on the temporary entry control in the editing state where the temporary entry control is dragged from the first location to a second location; and
 displaying the temporary entry control at the second location on the virtual environment picture in response to the drag operation.

18. The non-transitory computer-readable storage medium according to claim 17, wherein the displaying of the temporary entry control in the editing state comprises:
 switching a first filling element of the temporary entry control to a second filling element, the second filling element being configured for indicating that the temporary entry control is in the editing state.

19. The non-transitory computer-readable storage medium according to claim 17, wherein the instruction or program is configured to be loaded and executed by a processor to implement the further operations comprising:
 determining, in response to the location adjustment operation, that the temporary entry control is displayed for the first time; and
 displaying state prompt information that is configured for prompting that the temporary entry control is in the editing state.

20. The non-transitory computer-readable storage medium according to claim 17, wherein the displaying the temporary entry control at the second location further comprises:
 acquiring layout information at the second location in response to that the drag operation;
 acquiring, when the layout information indicates that there is another control at the second location, a first priority of the temporary entry control and a second priority of the another control;
 and displaying the temporary entry control superimposed on the another control at the second location when the first priority is higher than the second priority.

* * * * *